US010449692B2

(12) United States Patent
Balistreri et al.

(10) Patent No.: US 10,449,692 B2
(45) Date of Patent: Oct. 22, 2019

(54) THREE-DIMENSIONAL (3D) PRINTING

(71) Applicant: Tethon Corporation, Omaha, NE (US)

(72) Inventors: John Balistreri, Bowling Green, OH (US); James Linder, Omaha, NE (US); Karen A. Linder, Omaha, NE (US); Greg Pugh, Omaha, NE (US); Walter Bircher, Omaha, NE (US)

(73) Assignee: TETHON CORPORATION, Omaha, NE (US)

( * ) Notice: Subject to any disclaimer, the term of this patent is extended or adjusted under 35 U.S.C. 154(b) by 57 days.

(21) Appl. No.: 14/961,814

(22) Filed: Dec. 7, 2015

(65) Prior Publication Data

US 2016/0158962 A1 Jun. 9, 2016

Related U.S. Application Data

(60) Provisional application No. 62/088,897, filed on Dec. 8, 2014.

(51) Int. Cl.
*B33Y 70/00* (2015.01)
*B28B 1/00* (2006.01)
(Continued)

(52) U.S. Cl.
CPC .............. *B28B 1/001* (2013.01); *B22F 3/008* (2013.01); *B22F 3/03* (2013.01); *B29C 64/165* (2017.08);
(Continued)

(58) Field of Classification Search
CPC ................................. B33Y 10/00; B33Y 30/00
See application file for complete search history.

(56) References Cited

U.S. PATENT DOCUMENTS

| 2,522,548 A | 9/1950 | Streicher |
| 3,525,632 A | 8/1970 | Enoch |

(Continued)

FOREIGN PATENT DOCUMENTS

| DE | 19853834 | 5/2000 |
| DE | 10158233 | 3/2003 |

(Continued)

OTHER PUBLICATIONS

Bredt, Binder stability and powder/binder interaction in three-dimensional printing (prototyping) (Abstract) 1995.

(Continued)

*Primary Examiner* — Jacob T Minskey
*Assistant Examiner* — Melody Tsui
(74) *Attorney, Agent, or Firm* — Kevin E. West; Advent, LLP

(57) ABSTRACT

Three-dimensional (3D) printing systems include a 3D printer that includes a print bed that has one or more walls arranged to enclose a basin configured to contain a printing material. A compression plate is configured to fit slidably within, or on top surfaces of, the one or more walls of the print bed. A bottom plate forms a base of the basin and is configured to fit slidably within the one or more walls of the print bed. An elevation controller moves one or both of the compression plate and the bottom plate towards each other to apply a specified compressive force on printing material within the basin. The compression plate and the bottom plate together seal the basin sufficiently to avoid leakage of the print material from the basin.

17 Claims, 20 Drawing Sheets

(51) Int. Cl.
  *B22F 3/03* (2006.01)
  *B32B 7/02* (2019.01)
  *B32B 5/16* (2006.01)
  *B32B 5/30* (2006.01)
  *B22F 3/00* (2006.01)
  *B29C 64/165* (2017.01)
  *B29K 105/00* (2006.01)
  *B29K 103/06* (2006.01)
  *B33Y 10/00* (2015.01)
  *B33Y 30/00* (2015.01)
  *B33Y 50/02* (2015.01)
  *B33Y 80/00* (2015.01)
  *B22F 3/105* (2006.01)

(52) U.S. Cl.
  CPC .......... *B32B 5/16* (2013.01); *B32B 5/30* (2013.01); *B32B 7/02* (2013.01); *B33Y 70/00* (2014.12); *B22F 3/1055* (2013.01); *B22F 2998/10* (2013.01); *B22F 2999/00* (2013.01); *B29K 2103/06* (2013.01); *B29K 2105/251* (2013.01); *B32B 2264/105* (2013.01); *B32B 2264/107* (2013.01); *B33Y 10/00* (2014.12); *B33Y 30/00* (2014.12); *B33Y 50/02* (2014.12); *B33Y 80/00* (2014.12); *Y02P 10/295* (2015.11)

(56) References Cited

U.S. PATENT DOCUMENTS

| | | |
|---|---|---|
| 3,821,006 A | 6/1974 | Schwartz |
| 3,926,870 A | 12/1975 | Keegan et al. |
| 3,930,872 A | 1/1976 | Toeniskoetter et al. |
| 4,369,025 A | 1/1983 | von derWeid |
| 4,444,594 A | 4/1984 | Paddison et al. |
| 4,665,492 A | 5/1987 | Masters |
| 4,755,227 A | 7/1988 | Sherif et al. |
| 4,758,278 A | 7/1988 | Tomic |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,132,143 A | 7/1992 | Deckard |
| 5,147,587 A | 9/1992 | Marcus et al. |
| 5,154,762 A | 10/1992 | Mitra et al. |
| 5,155,324 A | 10/1992 | Deckard et al. |
| 5,176,188 A | 1/1993 | Quinn et al. |
| 5,204,055 A | 4/1993 | Sachs et al. |
| 5,252,264 A | 10/1993 | Forderhase et al. |
| 5,279,665 A | 1/1994 | Yunovich et al. |
| 5,296,062 A | 3/1994 | Bourell et al. |
| 5,301,415 A | 4/1994 | Prinz et al. |
| 5,316,580 A | 5/1994 | Deckard |
| 5,340,656 A | 8/1994 | Sachs et al. |
| 5,342,919 A | 8/1994 | Dickens et al. |
| 5,352,405 A | 10/1994 | Beaman et al. |
| 5,354,414 A * | 10/1994 | Feygin ............... B22C 9/00 216/34 |
| 5,382,289 A | 1/1995 | Bambauer et al. |
| 5,382,308 A | 1/1995 | Bourell et al. |
| 5,387,380 A | 2/1995 | Cima et al. |
| 5,393,613 A | 2/1995 | MacKay |
| 5,429,788 A | 7/1995 | Ribble et al. |
| 5,430,666 A | 7/1995 | DeAngelis et al. |
| 5,433,280 A | 7/1995 | Smith |
| 5,460,758 A | 10/1995 | Langer et al. |
| 5,490,882 A | 2/1996 | Sachs et al. |
| 5,490,962 A | 2/1996 | Cima et al. |
| 5,518,680 A | 5/1996 | Cima et al. |
| 5,527,877 A | 6/1996 | Dickens et al. |
| 5,536,467 A | 6/1996 | Reichle et al. |
| 5,593,531 A | 1/1997 | Penn |
| 5,595,597 A | 1/1997 | Fogel et al. |
| 5,597,589 A | 1/1997 | Deckard |
| 5,616,294 A | 4/1997 | Deckard |
| 5,622,577 A | 4/1997 | O'Connor |
| 5,632,848 A | 5/1997 | Richards et al. |
| 5,637,175 A | 6/1997 | Feygin et al. |
| 5,639,070 A | 6/1997 | Deckard |
| 5,639,402 A | 6/1997 | Barlow et al. |
| 5,640,667 A | 6/1997 | Freitag et al. |
| 5,648,450 A | 7/1997 | Dickens et al. |
| 5,653,925 A | 8/1997 | Batchelder |
| 5,658,712 A | 8/1997 | Steinmann et al. |
| 5,660,621 A | 8/1997 | Bredt |
| 5,688,464 A | 11/1997 | Jacobs et al. |
| 5,697,043 A | 12/1997 | Baskaran et al. |
| 5,718,757 A | 2/1998 | Guillou et al. |
| 5,730,925 A | 3/1998 | Mattes et al. |
| 5,733,497 A | 3/1998 | McAlea et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,772,947 A | 6/1998 | Hull et al. |
| 5,805,971 A | 9/1998 | Akedo |
| 5,851,465 A | 12/1998 | Bredt |
| 5,870,307 A | 2/1999 | Hull et al. |
| 5,902,441 A | 5/1999 | Bredt et al. |
| 5,902,537 A | 5/1999 | Almquist et al. |
| 5,976,339 A | 11/1999 | Andre |
| 6,007,318 A | 12/1999 | Russell et al. |
| 6,112,109 A | 8/2000 | D'Urso |
| 6,136,088 A | 10/2000 | Farrington |
| 6,147,138 A | 11/2000 | Hochsmann et al. |
| 6,193,922 B1 | 2/2001 | Ederer |
| 6,217,816 B1 | 4/2001 | Tang |
| 6,299,677 B1 | 10/2001 | Johnson et al. |
| 6,397,922 B1 | 6/2002 | Sachs et al. |
| 6,403,002 B1 | 6/2002 | van der Geest |
| 6,416,850 B1 | 7/2002 | Bredt et al. |
| 6,423,255 B1 | 7/2002 | Hoechsmann et al. |
| 6,600,129 B2 | 7/2003 | Shen et al. |
| 6,610,429 B2 | 8/2003 | Bredt et al. |
| 6,617,546 B2 | 9/2003 | Manetsberger et al. |
| 6,663,811 B2 | 12/2003 | Shen et al. |
| 6,907,307 B2 | 6/2005 | Chen et al. |
| 7,049,363 B2 | 5/2006 | Shen |
| 7,087,109 B2 | 8/2006 | Bredt et al. |
| 8,475,946 B1 * | 7/2013 | Dion .................. C04B 33/04 428/325 |
| 8,475,956 B2 * | 7/2013 | Kusachi ............... C08F 226/06 429/176 |
| 8,568,649 B1 | 10/2013 | Balistreri et al. |
| 8,845,953 B1 | 9/2014 | Balistreri et al. |
| 2002/0009622 A1 | 1/2002 | Goodson |
| 2002/0106412 A1 | 8/2002 | Rowe et al. |
| 2002/0176793 A1 | 11/2002 | Moussa et al. |
| 2002/0195746 A1 | 12/2002 | Hull et al. |
| 2002/0195747 A1 | 12/2002 | Hull et al. |
| 2003/0067098 A1 | 4/2003 | Newell et al. |
| 2003/0085488 A1 | 5/2003 | Newell et al. |
| 2004/0006405 A1 | 1/2004 | Chen et al. |
| 2004/0038009 A1 | 2/2004 | Leyden et al. |
| 2004/0060682 A1 | 4/2004 | Newell et al. |
| 2004/0081573 A1 | 4/2004 | Newell et al. |
| 2004/0138336 A1 | 7/2004 | Bredt et al. |
| 2004/0151935 A1 | 8/2004 | Dzugan et al. |
| 2004/0152581 A1 | 8/2004 | Bardes et al. |
| 2004/0173335 A1 | 9/2004 | Schaffer et al. |
| 2004/0182202 A1 | 9/2004 | Geving et al. |
| 2004/0183226 A1 | 9/2004 | Newell et al. |
| 2004/0184944 A1 | 9/2004 | Geving et al. |
| 2004/0226405 A1 | 11/2004 | Geving et al. |
| 2005/0003189 A1 | 1/2005 | Bredt et al. |
| 2005/0029175 A1 | 2/2005 | Farr et al. |
| 2005/0161189 A1 | 7/2005 | Sercombe et al. |
| 2005/0242473 A1 | 11/2005 | Newell et al. |

(56) References Cited

U.S. PATENT DOCUMENTS

2005/0252631 A1 11/2005 Bardes et al.
2009/0035411 A1 2/2009 Seibert et al.

FOREIGN PATENT DOCUMENTS

| | | |
|---|---|---|
| EP | 0431924 | 6/1991 |
| JP | 2001-162351 | 6/2001 |
| WO | 93/25336 | 12/1993 |
| WO | 95/30503 | 11/1995 |
| WO | 97/26302 | 7/1997 |
| WO | 98/09798 | 3/1998 |
| WO | 98/28124 | 7/1998 |
| WO | 00/26026 | 5/2000 |
| WO | 01/34371 | 5/2001 |

OTHER PUBLICATIONS

Charnnarong, "The drying shrinkage in three-dimensional printing and its dependence on the properties of the powder and the binder," MIT Thesis, Jun. 1996, 2 pages (Abstract).
Cima et al., "Structural Ceramic Components by 3D Printing," MIT, 1995, 11 pages (abstract).
continentalclay.com, "Pottery Plaster K-60 Mixing Instructions, Continental Clay Co.," printed from www.continentalclay.com on Mar. 23, 2017, 1 page.
Danforth, "Fused deposition of ceramics: a new technique for the rapid fabrication of ceramic components," Mat. Tech., 1995, 10:131-149 (Abstract).
Edirisinghe, "Solid freeform fabrication of ceramics," Minerals, Metals & Materials SOC, Oct. 1998, 2 pages (Abstract).
Gohring and Knitter, "Rapid manufacturing of ceramic microreactors," Keramische Zeitschrift (Germany), 2001, 53(6):480 (Abstract).
Griffin et al., "Bioceramic RP Materials for Medical Models," Proceedings of the 7th international conference on rapid prototyping. University of Dayton and Stanford University, 1997.
Griffin et al., "Rapid Prototyping of Functional Ceramic Composites," American Ceramic Society bulletin, 1996, 75(7):65-70.
Griffin, Design Issues: Ceramic Rapid Prototyping Options, undated.
International Preliminary Report on Patentability in International Application No. PCT/US2015/64343, dated Dec. 16, 2016, 8 pages.
International Search Report and Written Opinion in International Application No. PCT/US2015/64343, dated May 5, 2016, 12 pages.
Khanuja "Origin and control of anisotropy in three dimensional printing of structural ceramics," MIT, Feb. 1996, 3 pages (Abstract).
Kochan et al., Development of ceramic design objects by rapid-prototyping technologies (Abstract) 1999.
Lenk et al., "Ceramic components: From prototype to small series," Ceram. Forum Int./Ber. DKG. vol. 76. No. 4. 1999 (Abstract).
Plasters and Gypsum Cements, United States Gypsum Company, printed from usg.com on May 29, 2012.
Sachs et al., "Three-Dimensional Printing: the Physics and Implications of Additive Manufacturing," CIRP Annals—Manufacturing Technology, 1993, 42(1):257-260 (abstract).
Usg.com. "Industrial Plasters and Gypsum Cements: Versatile Products for Countless Industrial Applications," printed from usg.com on Mar. 23, 2017, 4 pages.
Utela et al., "Advanced Ceramic Materials and Processes for Three-Dimensional Printing (3DP)," Solid Freeform Fabr. Symp. Proc., 2006, vol. 17, 14 pages (abstract).
Vail and Barlow, "Ceramic Structures by Selective LaserSintering of Micro-encapsulated, Finely Divided Ceramic Materials," Solid Freeform Fabrication Symposium Proceedings. vol. 3. Center for Materials Science and Engineering, Mechanical Engineering Department and Chemical Engineering Department, The University of Texas at Austin, 1992, 7 pages (abstract).
Wang and Krstic, Rapid prototyping of ceramic components—review (Abstract) 1998.
Xiang et al., "Solid freeforming of ceramics using a drop-on demand jet printer," Proceedings of the Institution of Mechanical Engineers, Part B: Journal of Engineering Manufacture, 1997, 211(3):211-214, (Abstract).
Zhao et al., "Direct ink-jet printing of vertical walls," Journal of the American Ceramic Society, Aug. 2002, 85(8):2113-2115 (Abstract).

* cited by examiner

THREE-DIMENSIONAL (3D) PRINTING

CROSS-REFERENCE TO RELATED APPLICATIONS

This application claims priority to U.S. Provisional Application Ser. No. 62/088,897, filed on Dec. 8, 2014, entitled "Three-Dimensional (3D) Printing," the entire contents of which are hereby incorporated by reference.

FIELD OF THE INVENTION

The invention relates to three-dimensional (3D) printing.

BACKGROUND OF THE INVENTION

Three-dimensional (3D) printing is a type of additive manufacturing in which a desired 3D shape or object is built up from an available supply of material. The material is typically a solid that is temporarily melted, a liquid that is solidified, or a powder that is solidified during the manufacturing process. Examples of 3D printing techniques include stereolithography, in which a photo-responsive resin is hardened with a laser; fused deposit modeling (FDM), in which a solid material is melted, printed, and fused to surrounding material when solidified; and granular material binding, in which a bed of granular material is bound, often with heat or a fluid binder.

SUMMARY OF THE INVENTION

This disclosure describes 3D printing utilizing a compression plate to allow control of the density of a printed object made from a granular material, e.g., ceramic or metallic powder or sand. A compression plate can be temporarily secured on the top of a print bed, and a compressive force can be applied to the granular material, e.g., powder, in the print bed. Once the granular material is compressed, a binder solution can be deposited, resulting in a layer of the printed object being manufactured with a controlled density. By repeating this process for each layer of the object, a ceramic object with a specified density can be printed.

In one aspect, the three-dimensional (3D) printing systems include a 3D printer that includes a print bed that includes one or more walls that enclose a basin configured to contain a printing material. The systems further include a compression plate configured to fit slidably between the one or more walls within the basin, or to rest on top surfaces of the one or more walls. The systems further include a bottom plate that forms a base of the basin and is configured to fit slidably between the one or more walls of the print bed. The systems further include an elevation controller to move one or both of the compression plate and the bottom plate towards each other to apply a specified compressive force on printing material within the basin. The compression plate and the bottom plate together with the one or more walls seal the basin sufficiently to avoid leakage of the print material from the basin.

Implementations can include any, all, or none of the following features. The systems include a processor programmed to control the 3D printer to print an object by: i) loading printing material into the basin of the print bed; ii) applying a compressive force to the printing material; and iii) printing a binder onto the compressed printing material. The compression plate is rotationally coupled to the 3D printer by a hinge. To apply a compressive force to the printing material, the 3D printer is controlled to rotate the compression plate to contact the top surfaces of the one or more walls of the print bed. The elevation controller includes a linear extender configured to move the compression plate toward the bottom plate. The elevation controller engages the bottom plate and is configured to move the bottom plate toward the compression plate.

In another aspect, the systems include a three-dimensional (3D) printer that includes a print bed that includes one or more walls that enclose a basin configured to contain a printing material. The systems further include a compression plate configured to fit slidably between the one or more walls within the basin, or to rest on top surfaces of the one or more walls of the print bed. The systems can further include a bottom plate that forms a base of the basin and is configured to fit slidably between the one or more walls of the print bed. In addition, the systems can include means for moving one or both of the compression plate and the bottom plate towards each other to apply a specified compressive force on printing material within the basin. The compression plate and the bottom plate together with the one or more walls seal the basin sufficiently to avoid leakage of the print material from the basin.

Implementations can include or consist of any combination of, all of, or none of the following features. The systems can include a processor programmed to control the 3D printer to print an object by: i) loading printing material into the basin of the print bed; ii) applying a compressive force to the printing material; and iii) printing a binder onto the compressed printing material. The compression plate can be rotationally coupled to the 3D printer by a hinge. To apply a compressive force to the printing material, the 3D printer is controlled to rotate the compression plate to contact the top surfaces of the one or more walls of the print bed. The system can include a linear extender configured to move the compression plate toward the bottom plate. The bottom plate can be configured to move toward the compression plate.

In another aspect, the disclosure provides methods of three-dimensional (3D) printing that include loading printing material into a basin of a print bed of a 3D printer. The print bed includes one or more walls that enclose the basin. The method further includes applying a compressive force to the printing material with an elevation controller configured to move one or both of a compression plate and a bottom plate towards each other to apply a specified compressive force on printing material within the basin. The compression plate is configured to fit slidably between the one or more walls within the basin, or to rest on top surfaces of the one or more walls of the print bed. The bottom plate forms a base of the basin and is configured to fit slidably between the one or more walls of the print bed. The compression plate and the bottom plate together with the one or more walls seal the basin sufficiently to avoid leakage of the print material from the basin.

Implementations can include any combination of, all of, or none of the following features. The compression plate is rotationally coupled to the 3D printer by a hinge. To apply a compressive force to the printing material, the 3D printer is controlled to rotate the compression plate to contact the top surface of the one or more walls of the print bed. The elevation controller includes a linear extender configured to move the compression plate toward the bottom plate. The elevation controller engages the bottom plate and is configured to move the bottom plate toward the compression plate.

In another aspect, the disclosure provides an article of manufacture that includes a plurality of layers created by a three-dimensional (3D) printing process. At least one layer has a different density than one of the other layers. Implementations can include or consist of any, all, or none of the following features. The article of manufacture is a ceramic that has been fired in a kiln. The article of manufacture is a ceramic that has not been fired in a kiln.

The systems and processes described herein provide a number of potential advantages. For example, a compression plate can be mounted next to a powder bed in a 3D printer so that it can be lowered to cover the powder bed when a trolley is traveling away from the powder bed. The compression plate can be used to apply a compressive force to the top layer of the powder in the powder bed, allowing for a pre-determined density of powder to be achieved for each layer of the printed object. As such, an object can be printed in which one, some, or all of the layers have a pre-determined density. In the case of, for example, ceramic objects, the ability to control density can lead to the ability to produce a wide variety of objects from a single machine.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

The 3D printers described herein can be used for manufacturing ceramic pieces from a granular material, e.g., a powder, and liquid binder, and include a compression plate. This compression plate can be used to apply compression to powder in the printer to carefully control, e.g., to increase, the density of each new layer of the powder before the liquid binder is printed onto the powder. As each successive layer of powder is compressed and printed, the 3D printer can produce a ceramic object whose density is controlled throughout the object.

To apply the compressive force, the compression plate and the bottom of the print bed are pressed toward each other. For example, a mechanism that lowers the print bed for each layer of printing can be also be used to push the powder upward, toward the compression plate. In another example, the compression plate may be pushed downward, toward the bottom of the print bed, using a separate mechanism.

In general, many 3D printers use a build plan created from a model of the desired 3D object, where the model has been sliced into parallel layers, either physically or in a computer rendition of the object. To accommodate the compression that each physical layer will experience, some or all of the layers in the build plan may be modified so that, after all compression is applied, the physical layers will provide the correct shape for the 3D object to be printed.

Printer Overview

Figure 1:
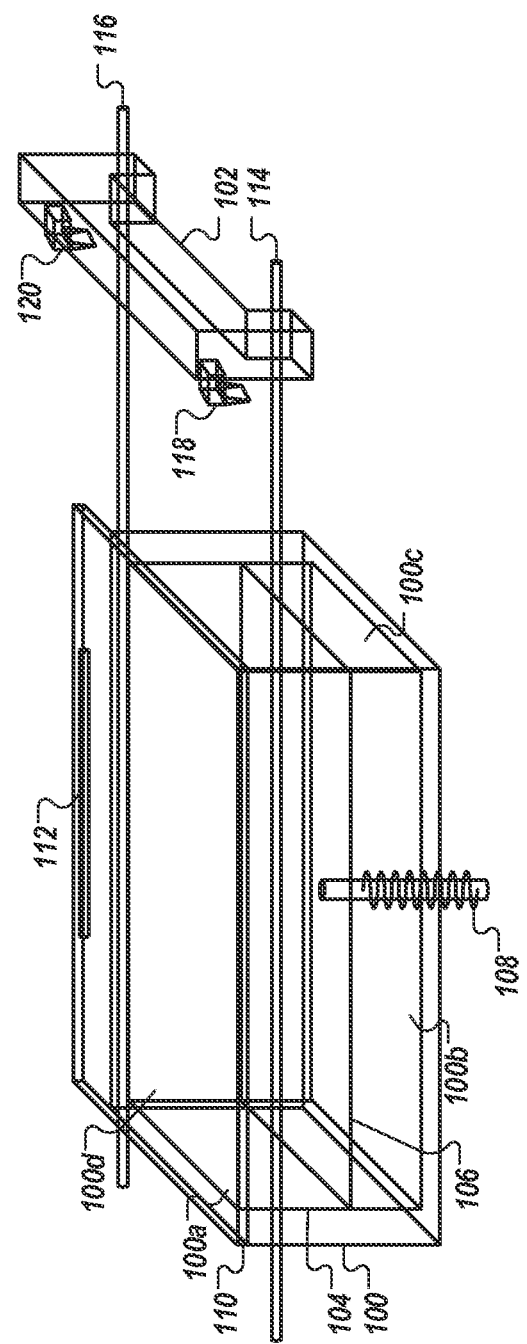
FIG. 1 is an isometric view of an example of a print bed and trolley.

FIG. 1 is an isometric view of an example of a print bed 100 and trolley 102. This view is shown as a wireframe in which the edges of surfaces are shown, including hidden edges. The print bed 100 and trolley 102 may be internal components of, for example, a 3D printer that is used to manufacture an object from a powder material and a liquid binder. While not shown here, the 3D printer may also include a supply bed from which additional material is loaded into the print bed 100 by the trolley 102.

The print bed 100 includes a basin 104. The powder, possibly along with a partially printed piece, may fill the basin 104. The bottom of the basin 104 is formed by a movable bottom plate 106 that is arranged to slide within the walls of the print bed 100 (in the example of FIG. 1, these walls are shown as 100a, 100b, 100c, and 100d.) The bottom plate 106 can be raised or lowered within the basin 104 by an elevation controller 108. In this example, the elevation controller 108 is a solid rod or hollow cylinder with an external helical screw thread that, as it rotates, raises or lowers the bottom plate 106.

The top of basin 104, and possibly the top of print bed 100, can be covered by compression plate 110. The compression plate is held in place when engaged with the basin 104, such that if and when the elevation controller 108 pushes bottom plate 106 upward, the compression plate 110 stays in place, thereby applying a compressive force to the build powder and partially printed object inside the basin 104. In some configurations, the compression plate 110 is of sufficient weight to be held in place during compression by gravity. In some configurations, the compression plate 110 is held in place with a latch, not shown, or other mechanism such as a magnet or electromagnet. In some configurations, a geared motor controlling the compression plate 110 (not shown) applies positive force during the compression step to hold the compression plate 110 in place during compression.

After compression, the compression plate 110 may be removed from the print bed 100, and the trolley 102 travels to print the next layer of binder for the object. For example, the compression plate 110 can rotate around a hinge 112, or can be lifted directly upward. In some other examples, the compression plate 110 may be moved by a linear actuator, rotating wheels or gears, by rack and pinion, belt and pulley, or other appropriate mechanism. The goal is to provide a carefully controlled vertical motion of the bottom plate to gradually compress a layer of powder in basin 104 between the bottom plate and compression plate 110.

Once the compression plate 110 is removed, the trolley 102 can travel along rails 114 and 116 over the print bed 100 to dispense liquid binder onto the now-compressed powder. While traveling along the rails 114 and 116, sweepers 118 and 120 may clean debris, such as stray powder, from the top of the print bed 100. The sweepers 118 and 120 may be composed of, for example, bristle brushes, elastomeric wedges, or other appropriate structures. By sweeping the top of the print bed clear, the sweepers 118 and 120 ensure that the compression plate 110 is able to correctly contact the basin 104 and/or print bed 100.

Powder Compression

Figure 2:
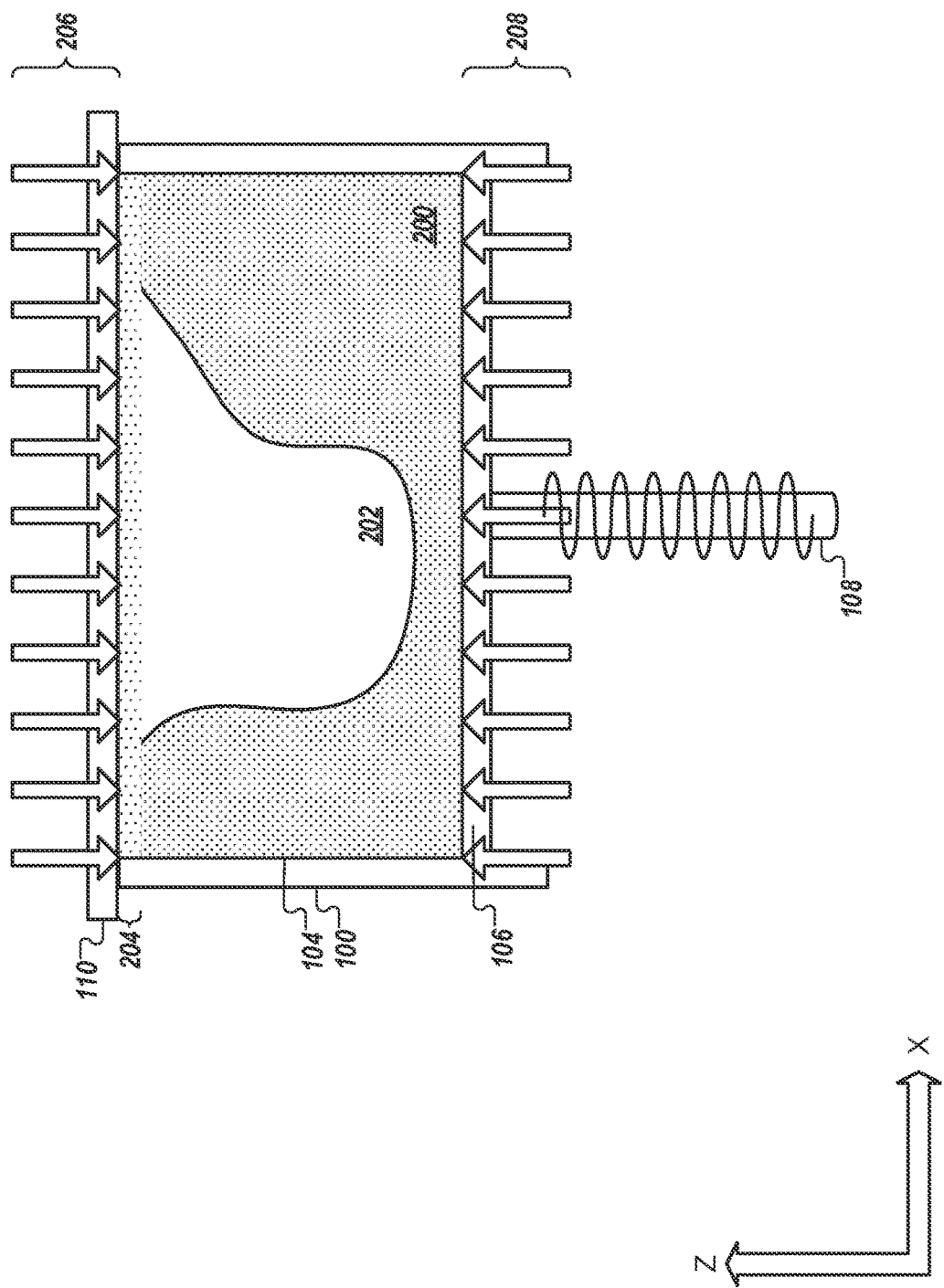
FIG. 2 is a side view of compressive forces applied to the print bed of FIG. 1.

FIG. 2 is a side view of compressive forces applied to the print bed 100 shown in FIG. 1. Shown here, the print bed 100 described above will apply compressive pressure to the contents of the basin 104—namely powder 200 and a partially printed object 202.

As shown in FIG. 2, the powder 200 in the print basin 104 has been compressed and printed on a number of times previously. To print the piece 202, the printer has repeatedly loaded a layer of powder into the basin 104, compressed the powder 200, and printed a single layer of the piece 202 with a liquid binder. As such, all but the top layer 204 of the powder 200, as well as the piece 200, has been compressed at least one time. However, the top layer 204 of the powder 200 has been loaded into the basin 104, but has not yet been compressed.

With the compression plate 110 in place, the bottom plate 106 can apply compressive force 208 to the powder 200, including the top layer 204. For example, the elevation controller 108 can rotate to raise the bottom plate 106 toward the compression plate 110. In response, the least compressed powder 200 becomes compressed—increasing in density and decreasing in vertical thickness. As layer 204 is the portion of the powder 200 that is so far the least compressed, that is the section of the powder 200 that will be most, or exclusively, compressed when subjected to the compressive force 208, which pushes this powder against compression plate 110.

Figure 9A:
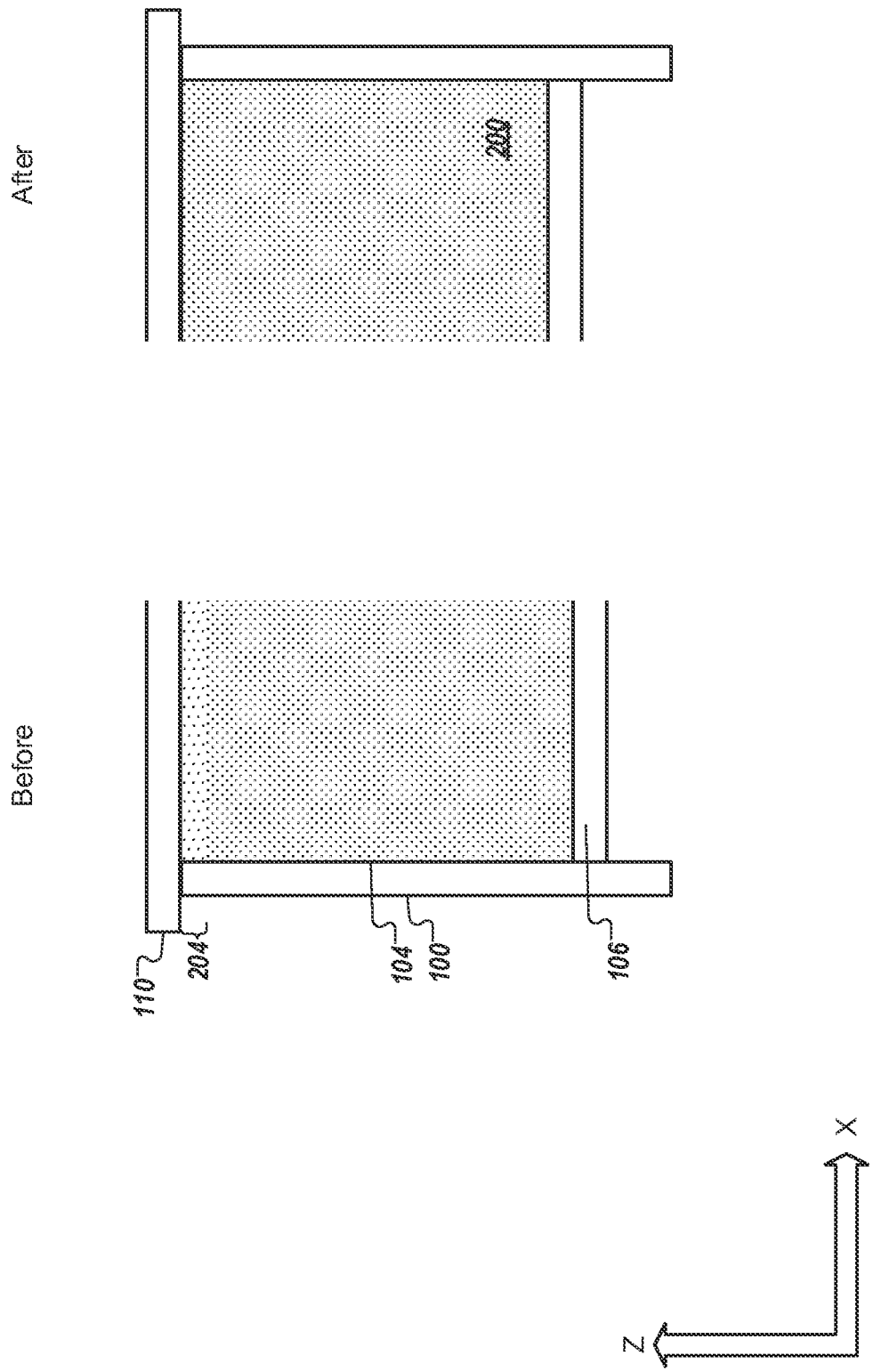
FIGS. 9A-9B are schematic views of print material in examples of print beds.
Figure 9B:
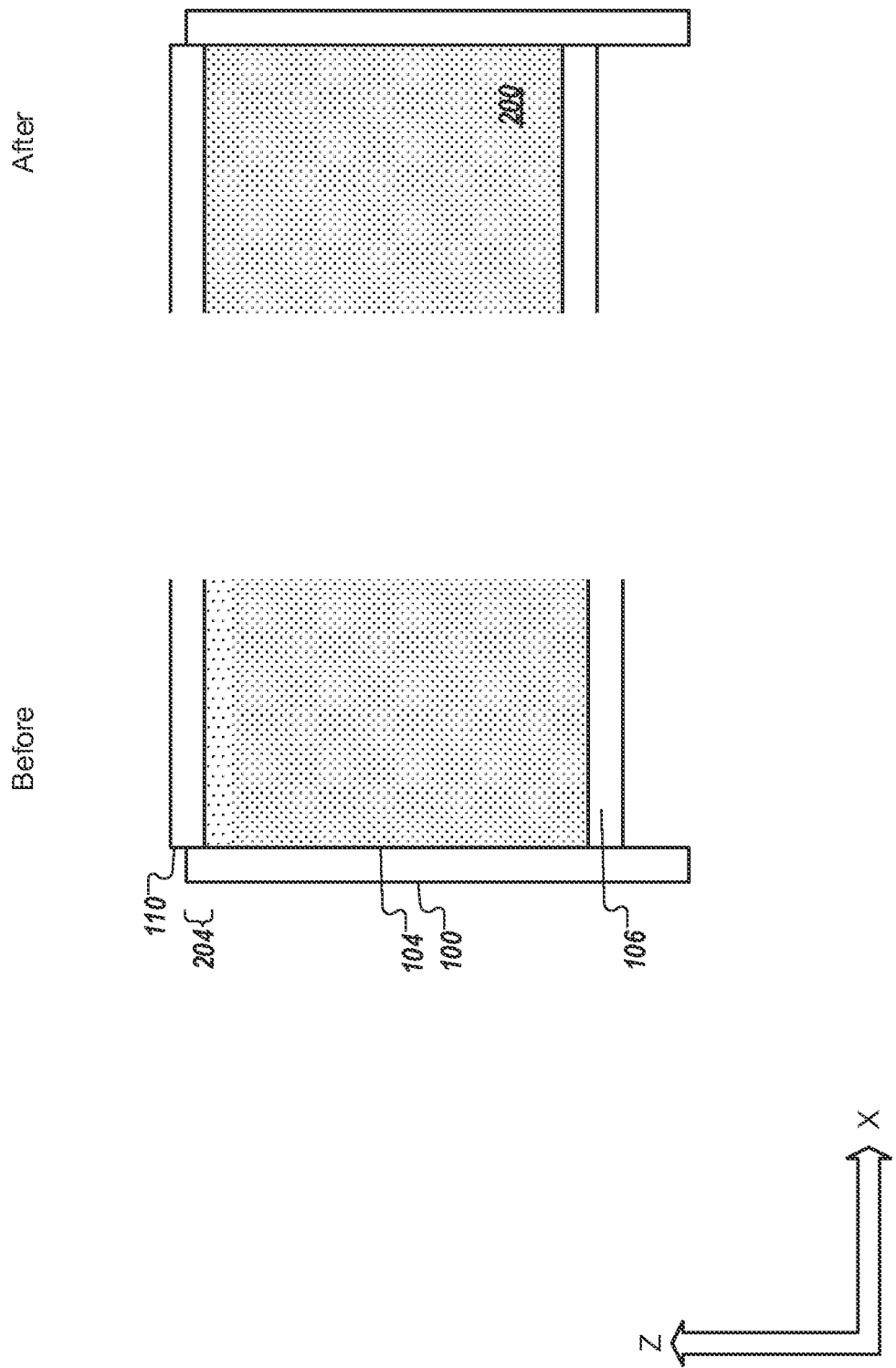

In other embodiments, such as shown in FIG. 9B, the compression plate 110 can enter the basin 104 and apply compressive force 206 to the powder 200, including the top layer 204. This force 206 may be applied instead of, or in addition to, the compressive force 208.

The compressive forces 206 and 208 can be two force fields that are each uniform in force distribution, normal to the compression plate 110 and/or bottom plate 106, and applied slowly. That is, the forces 206 and 208 can be constant across the entire top and/or surface of the powder 200, being effectively no greater or weaker at any particular point on bottom plate 106 or compression plate 110. The forces 206 and 208 may, in the orientation shown, contain only vertical components—downward for force 206 and upward for force 208. They may be configured to have no horizontal component and, as such, may compress the powder 200 only in the vertical direction. Because the print bed 100 and compression plate 110 completely surround the powder 200, horizontal translation of the powder 200 is prevented, completely or substantially, when the forces 206 and 208 are applied. That is, the configurations of the print bed 100 and compression plate 110 are designed to prevent horizontal shear failures of the piece 202 when the forces 206 and 208 are applied. By applying the forces 206 and 208 slowly, the impulse applied to the piece 202 can be restricted to be low enough that it does not cause a failure of the piece 202. The particular force of the forces 206 and 208, including the speed at which they are applied, can depend on characteristics of each piece 202, which can depend on the type of powder, binder, and density of the powder 200.

As shown, the side walls 100a, 100b, 100c, and 100d of the basin 104 are stationary. This may be desirable, for example, because the part 202 is relatively fragile and/or brittle. As a result, any force applied horizontally to the piece 202, the powder 200, and/or the basin 104 may deform or break the piece 202.

After the compressive forces 206 and/or 208 are applied to the powder 200, the layer 204 will have a greater density and will likely be reduced in vertical thickness. The compression plate 110 is then removed from the basin 104 and/or print bed 100, and the next layer of binder can be printed onto layer 204. Once this layer is printed, the elevation controller 108 rotates to lower the bottom plate 106 and therefore the powder 200 and the piece 202. This lowering creates an empty volume on top of the powder 200, where a new layer, not shown, of powder can be deposited, and the above compression process repeated.

The Printing Process

Figure 3A:
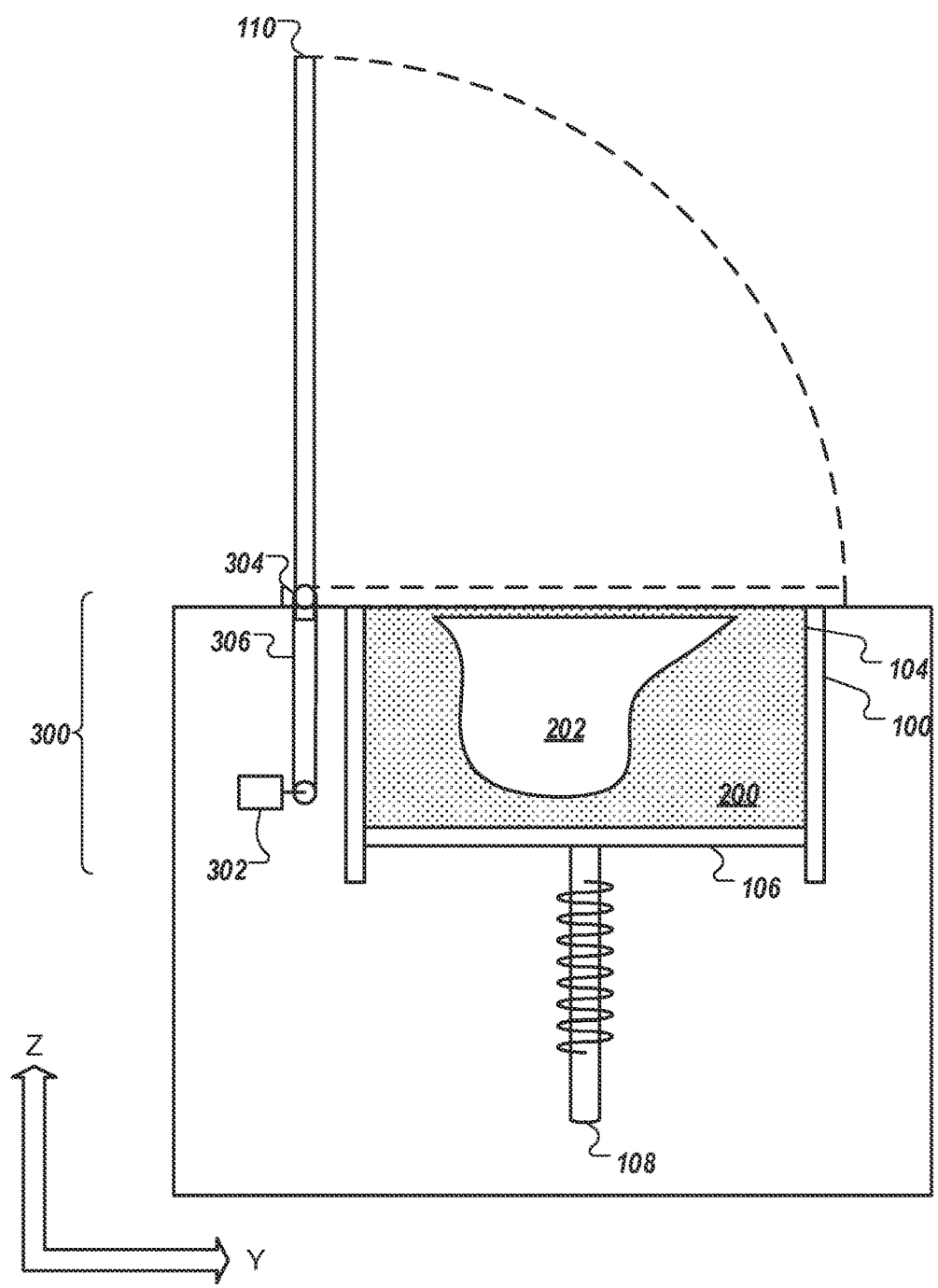
FIGS. 3A-3C are side views of an example of a print bed.
Figure 3B:
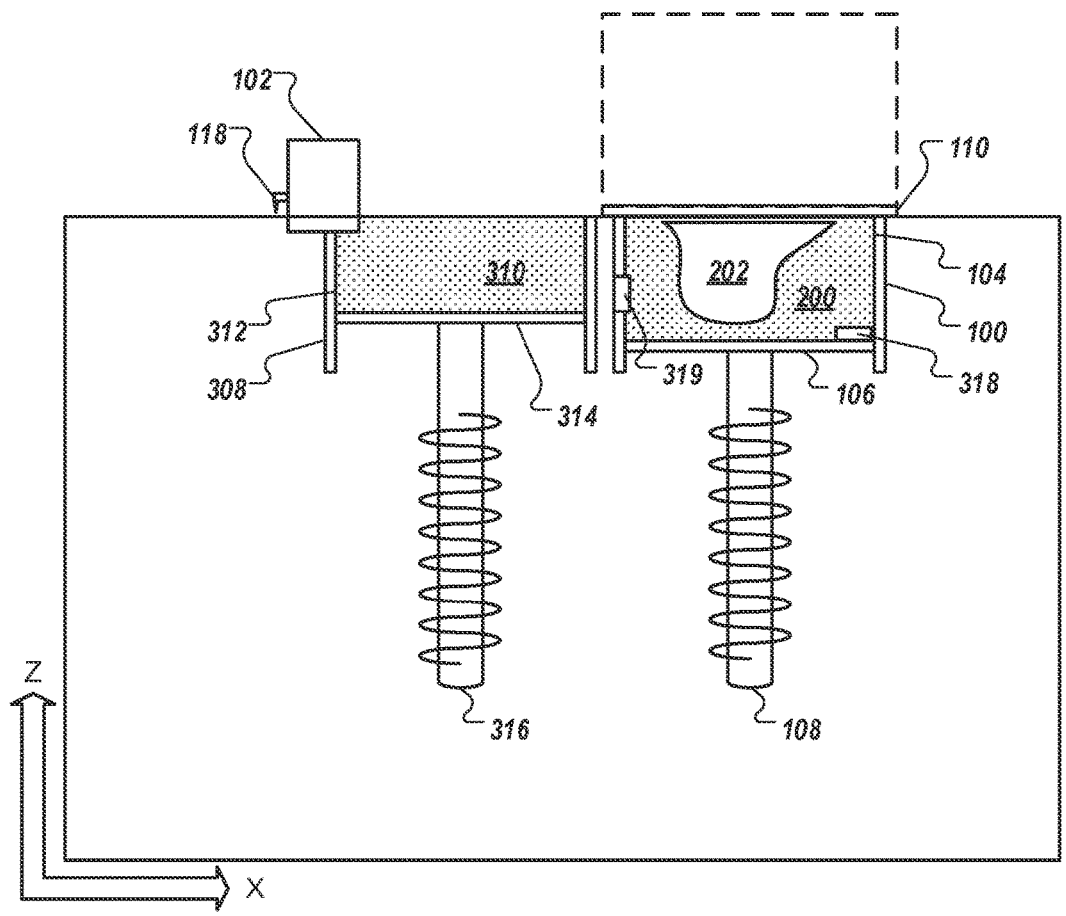
Figure 3C:
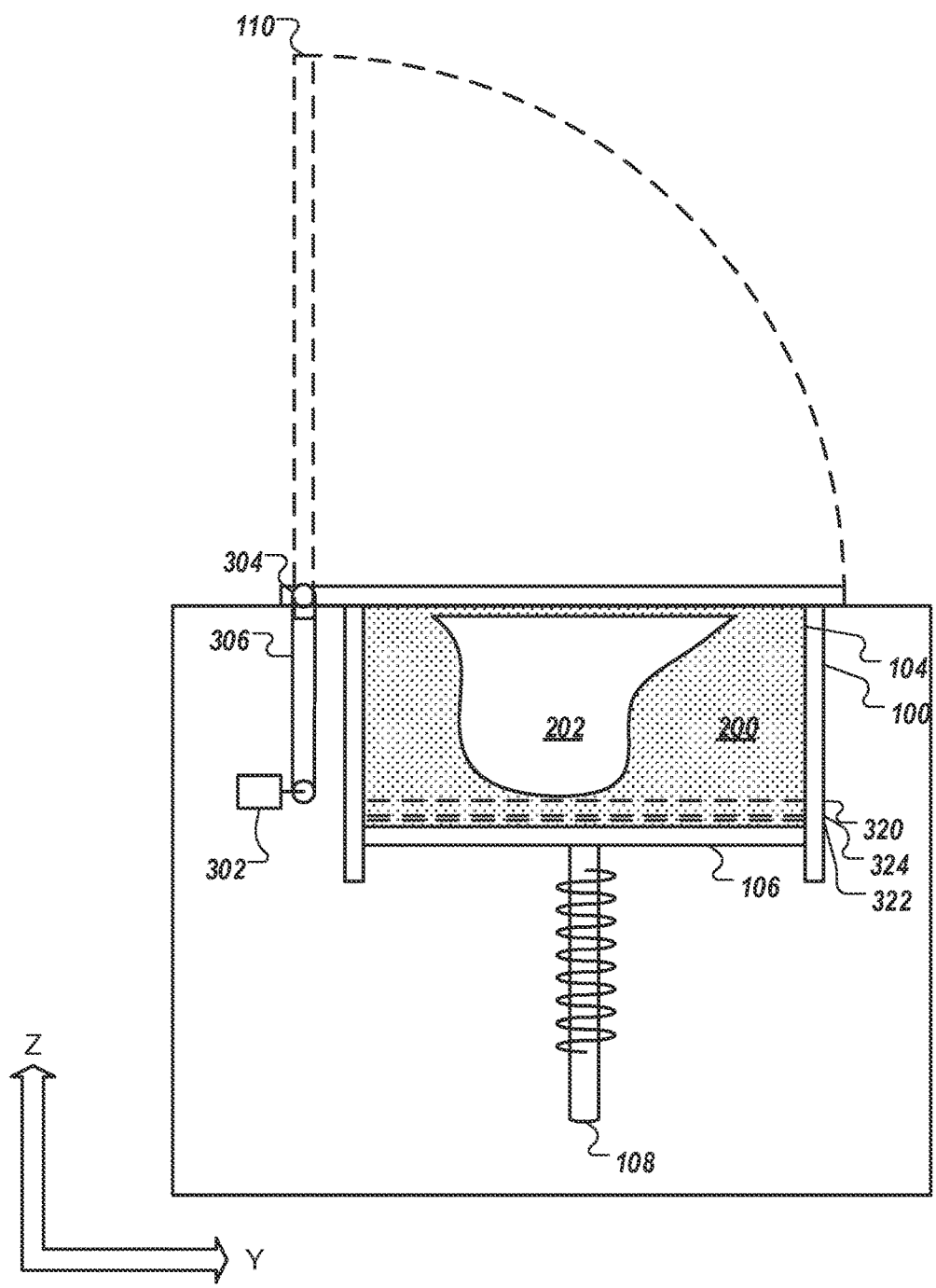

FIGS. 3A-3C are side views of the example of a print bed 100 shown in FIGS. 1 and 2. These figures will be used to describe the process of printing a layer of the build piece in the print bed 100

FIG. 3A shows a 3D printer that contains the print bed 100. The view of FIG. 3A is along the X-axis of the 3D printer. From this view, the print bed 100, basin 104, bottom plate 106, elevation controller 108, compression plate 110, powder 200, and piece 202 are shown. In this view, the compression plate 110 is raised, separated from the basin 104, rotated about the hinge 112 compared to the view shown in FIG. 1 and FIG. 2. Other elements of the 3D printer are not shown for clarity. Such other elements include, but are not limited to, a lid to enclose the print bed 100, and a logic unit (e.g., processor, memory, and input and output systems) to control the elements of the 3D printer.

The system includes a control system 300 to manipulate and control the compression plate 110. In this example, the control system 300 includes a motor-driven pulley 302 connected to a sprocket 304 on the hinge 112 by a belt 306. When the motor engages, it can rotate the pulley 302 to pull the belt 306 past the sprocket 304. The sprocket, in turn, can transfer that movement to the compression plate 110, causing the compression plate 110 to rotate about the hinge 112 and raise or lower, depending on the direction of movement of the pulley 302.

FIG. 3A shows, in hashed lines, the range of motion of the compression plate 110, including the location of the compression plate 110 engaged with the print bed 100 in the closed position. The compression plate 110 shown in solid lines shows the compression plate 110 disengaged from the print bed 100 in the open position.

FIG. 3B shows the 3D printer along the Y-axis of the 3D printer. From this view, the print bed 100, trolley 102, the basin 104, bottom plate 106, elevation controller 108, compression plate 110, sweep 118, powder 200, and piece 202 are shown.

In addition, FIG. 3B shows supply bed 308, which contains a supply of unused powder 310 that trolley 102 can use to load the print bed 100. Similar to print bed 100, supply bed 308 can include a basin 312 and a bottom plate 314 whose elevation is controlled by an elevation controller 316. To load the powder from the supply bed 308 into the print bed 100, the trolley 102 moves from left to right, dragging powder from the supply bed 308 to the print bed 100.

During this loading process, the trolley 102 may spill some excess powder onto the top of the print bed 100, along the surface that the compression plate 110 contacts when in the closed position. To allow for proper contact, sweeps 118 and 120 are arranged to sweep this excess powder away from the top of print bed 100. As the sweeps 118 and 120 are mounted on the left side of the trolley 102 and the trolley 102 moves from left to right to load the powder, the sweeps 118 and 120 will sweep away any spilled powder.

Once the powder has been loaded into the print bed 100, the compression plate 110 can be lowered, sealing the powder 200 in the basin 104. The elevation controller 108 is then rotated to apply a compressive force to the powder 200. In some implementations, one or more mechanical stops 318 are arranged in the 3D printer to prevent over-pressurizing the powder 200. These stops 318 may, for example, limit the travel distance of the bottom plate 106 directly, or may limit the rotation of the elevation controller 108, which can indirectly limit the travel distance of the bottom plate 106.

Additionally or alternatively, the print bed 100 may include one or more sensors 319 to limit the travel of the plate 108 and/or the pressure on the powder 200. For example, a contact sensor 319 may detect when the plate 108 travels a predefined distance, and report that reading to the logic unit controlling the elevation controller 108. In another example, a pressure sensor 319 located on a side-wall of the basin 104 may detect when the top layer of the powder 200 reaches a particular pressure and report that reading to the logic circuit. In response to receiving one of these reports, the logic circuit can stop movement of the elevation controller 108.

The compression process may be carried out while the trolley 102 is moving and/or when the trolley 102 is at rest. For example, the 3D printer does not need to wait until the trolley 102 finishes moving to the left before the compression plate 110 is lowered and the compression applied to the powder 200. Instead, the 3D printer may only need to wait until the trolley 102 passes past the compression plate 110 and is above the supply bed 308.

FIG. 3C shows the 3D printer along the X-axis of the 3D printer. In FIG. 3C, three different elevations of the bottom plate 106 are shown as used for printing a layer of the piece 202. First, the bottom plate 106 is at an initial elevation 320. The initial elevation 320 is the highest of the three elevations. The bottom plate 106 is at the initial elevation 320 when the immediately previous layer of the piece 202 is printed, and at the start of the current layer.

The bottom plate 106 is then lowered a first distance to elevation 322. By moving this first distance, the bottom plate 106 creates a void in the basin 104 above the powder 200 where the trolley 102 can load a layer of uncompressed powder. Once the layer of uncompressed powder is loaded, the compression plate 110 can close onto the print bed 100 and the bottom plate 106 is raised up a second distance to a third elevation 324. By elevating this second distance, with the compression plate 110 closed, the bottom plate 106 and the compression plate 110 can apply a compressive force to the powder 200, increasing the density of at least the newly deposited top layer of powder.

Once the compressive force has been applied, the compression plate 110 is moved to the open position, and the trolley 102 can print the next layer of binder onto the top of the powder 200. After the printing is completed, the current layer of the object 202 can be considered complete, and the third elevation 324 can be considered the next layer's first elevation 320.

In general, a first distance between 320 and 322 is the layer depth of each layer of the piece 202 plus a compression distance to account for the volumetric shrinkage in the Z-direction of the powder 200 when compressed. A second distance between 322 and 324 is the compression distance.

In one example, the compression distance may be a percentage of the layer thickness. This thickness may be pre-set, or user-set, for example in the build plan used to create the object 202. In some configurations, this percentage may be from 0% to 70%, but other percentages are possible.

Other parameters that may be set for an object to be printed include layer thickness, saturation, compaction %, and model compensation. Layer thickness is a value, for example a linear unit, of the thickness of each layer of the build piece 200, either before or after compression. Saturation is a value, for example in volume, of binder printed per unit time, area, or length. Compaction % is the percentage of the layer thickness by which a layer is compacted. Model compensation is a percentage that a layer will be compacted after being subjected to repeated compressions.

Alternate Compression Plate Configurations

A compression plate 110 that is coupled to the print bed by a hinge 112 has been described above. However, other configurations of this coupling are possible and some examples of other configurations are described below. It will be appreciated that still further configurations are possible. In many cases, a structure of some type may be included to rigidly connect the compression plate with the print bed or bottom plate of the print bed so that a compressive force can be applied to the powder.

FIGS. 4A-6B are side views of examples of 3D printers 400, 450, 500, 550, 600, 650, 700, and 800. Each of the 3D printers 400, 450, 500, 550, 600 and 650 are shown from along the X-axis, while each of the 3D printers 700 and 800 are shown from along the Y-axis. In each view, the print bed 100, basin 104, bottom plate 106, elevation controller 108, and compression plate 110, powder 200, and piece 202 are visible. Each of the 3D printers 400, 450, 500, 550, 600, 650, 700, and 800 can control the elevation of the compression plate 110, and can compress the powder 200 by moving the compression plate 110 down, moving the bottom plate 106 up, or both.

Figure 4A:
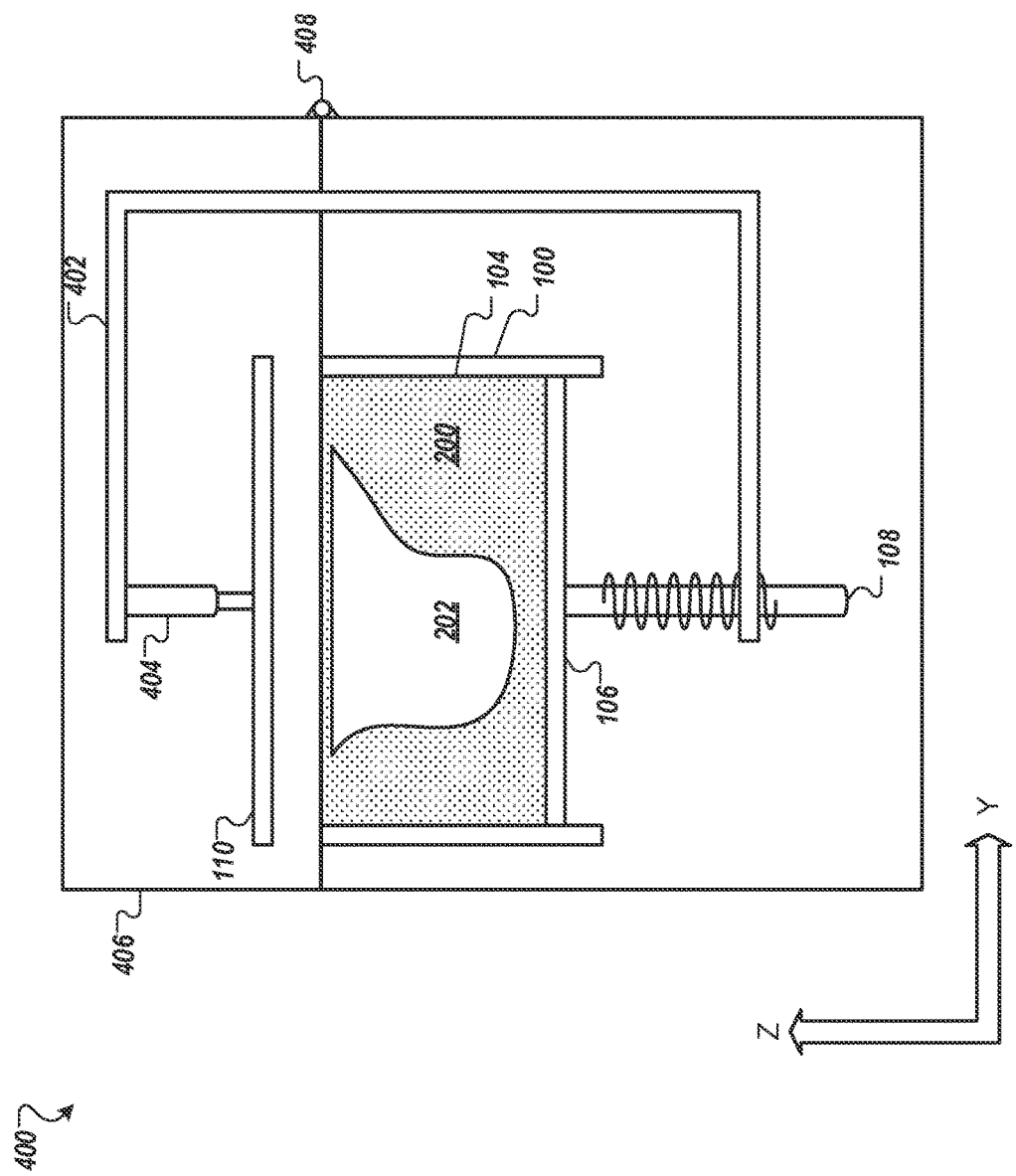
FIGS. 4A-8B are side views of 3D printers.

In FIG. 4A, 3D printer 400 includes a bracket 402 and a linear extender 404. The bracket 402 and linear extender 402 are rigid members that can connect the elevation controller 108 with the compression plate 110. The linear extender 404 is capable of extending and refracting to move the compression plate 110 onto and away from the print bed 110. As shown, the linear extender 404 is refracted, with the compression plate 110 lifted away from the print bed 100. Examples of linear extenders include, but are not limited to, linear actuators with electrical motors (rotary, linear, or otherwise), pneumatic systems, and/or a linkage or parallel mechanism such as a scissor lift.

When the powder 200 is compressed, either by, for example, the bottom plate 106 moving upward by the action of the elevation controller 108 and/or the compression plate 110 moving downward by the action of the linear extender 404, the forces can be transmitted along the bracket 402 and linear extender 404. In this example, the bracket 402 is shown connected to the elevation controller 108. However, other configurations are possible. For example, the bracket 402 may be connected to the basin 104 or any other appropriate element of the printer 400.

The printer 400 can be accessed by lifting a lid 406, which can rotate around a hinge 408. With the lid 406 lifted, an operator can service the printer 400, for example to add or remove powder or to remove a printed object.

Figure 4B:
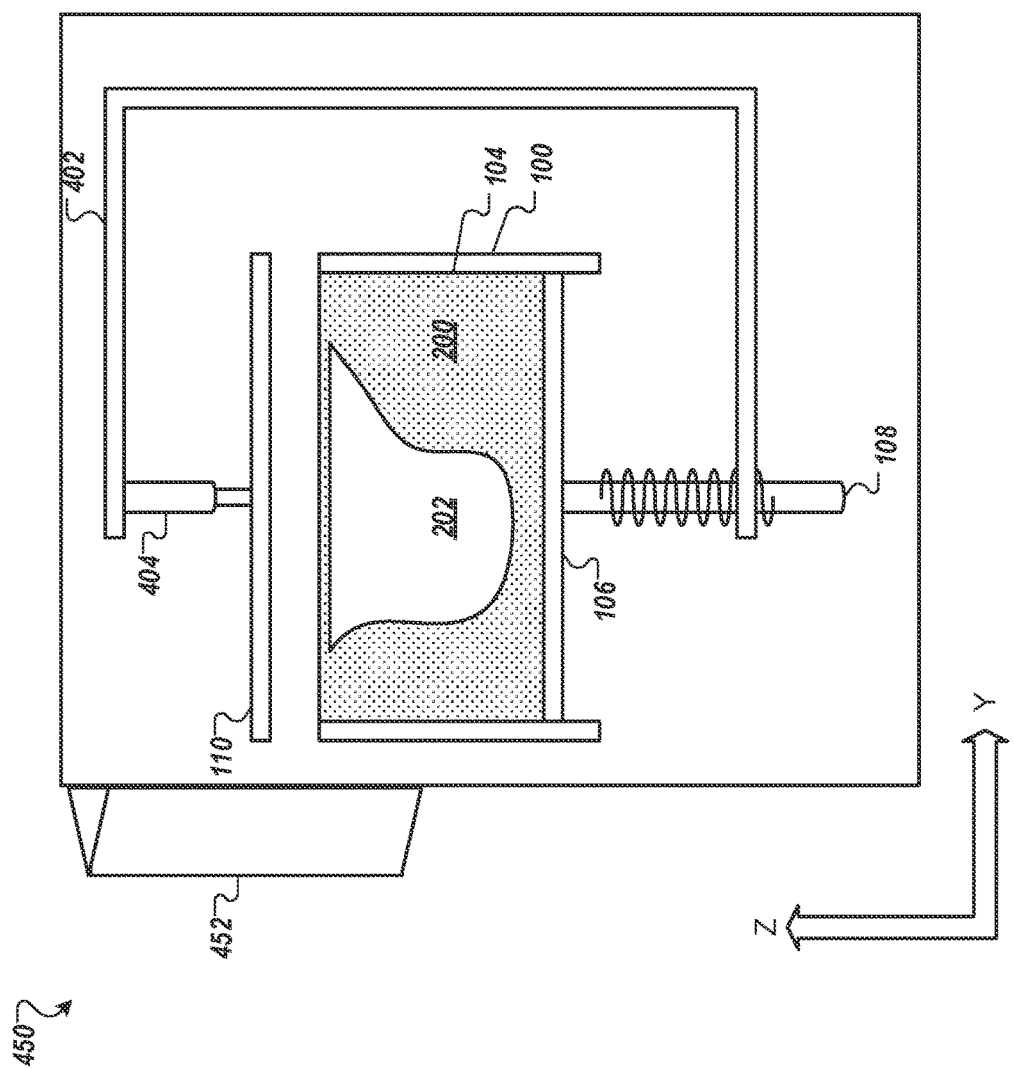

In FIG. 4B, 3D printer 450 also includes the bracket 402 and the linear extender 404. The printer 450 can be accessed by opening curtains 452. With the curtains 452 opened, an operator can service the printer 450, for example to add or remove powder or to remove a printed object.

Figure 5A:
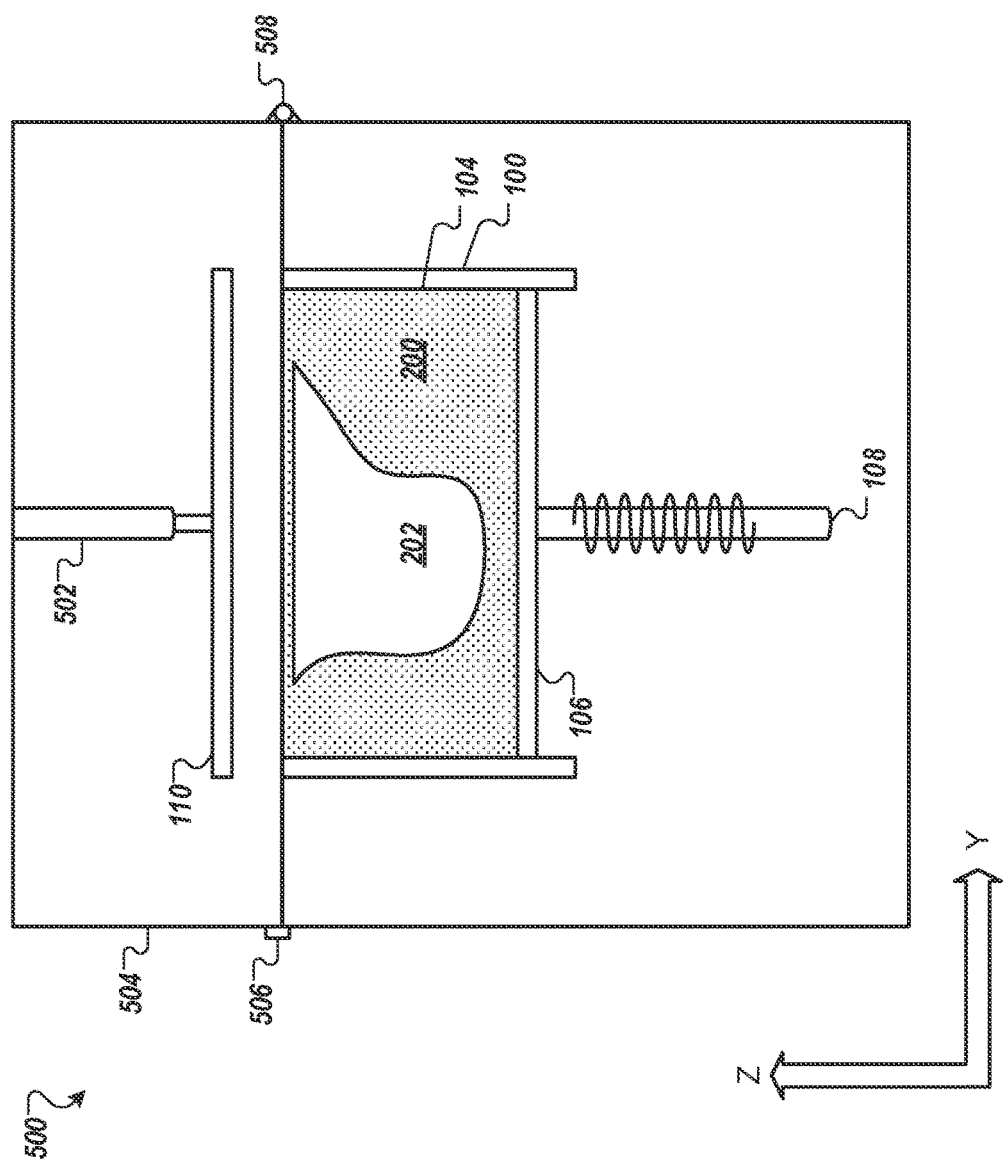

In FIG. 5A, 3D printer 500 includes a linear extender 502 connected to a lid 504 of the 3D printer 500. The linear extender 502 is a rigid member that can connect the lid 504 of the 3D printer 500 with the compression plate 110. The linear extender 502 is capable of extending and refracting to move the compression plate 110 onto and away from the print bed 100. As shown, the linear extender 502 is refracted, with the compression plate 110 lifted away from the print bed 100.

The lid 504 may be connected to the body of the 3D printer 500 with a latch 506 and a hinge 508. The lid may, for example, rotate about the hinge 508, and may lock in the closed position with the latch 506. The latch 506 may be manually controlled, controlled by the 3D printer, and/or controlled by any other appropriate device such as a safety system.

When the powder 200 is compressed, either by, for example, the bottom plate 106 moving upward by the action of the elevation controller 108 and/or the compression plate 110 moving downward by the action of the linear extender 502, the forces can be transmitted by the lid and body of the 3D printer, including the latch 506 and hinge 508.

Figure 5B:
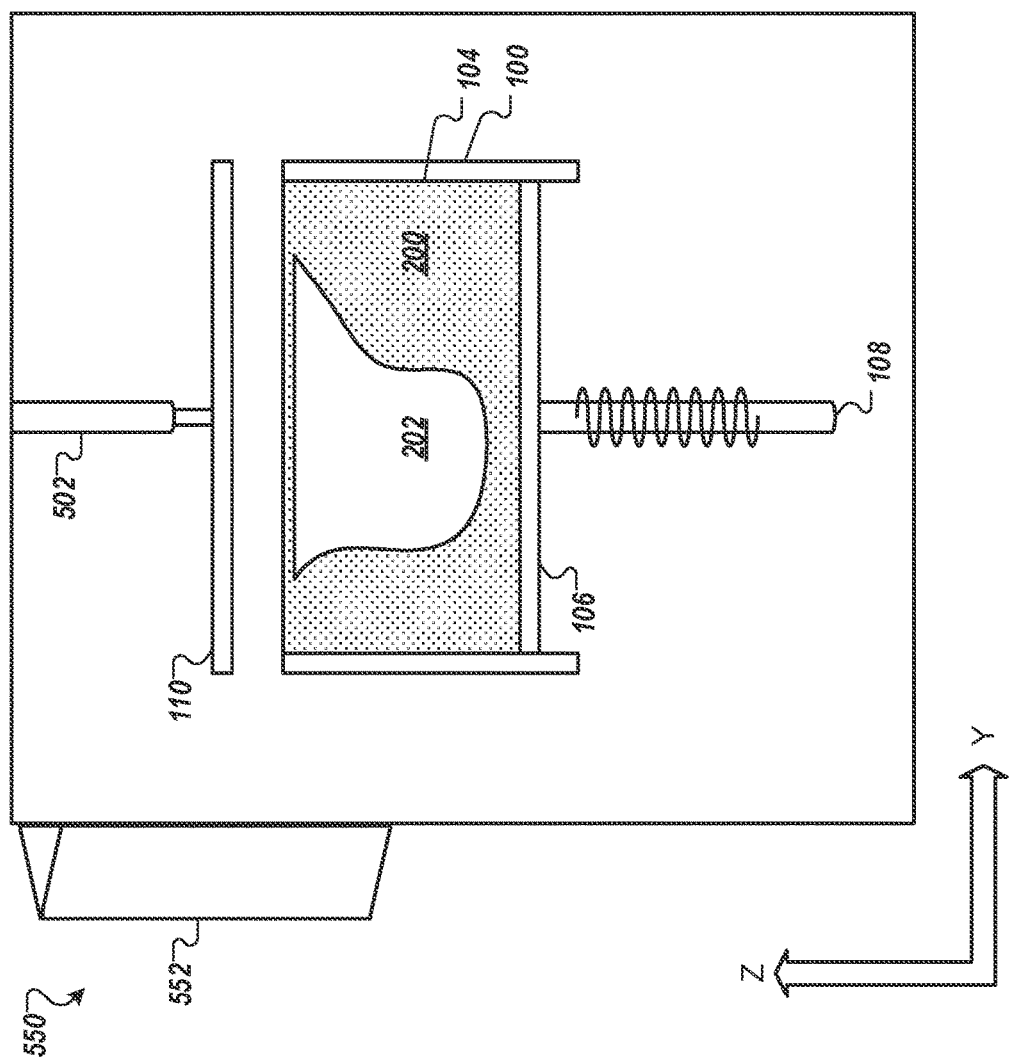

In FIG. 5B, 3D printer 550 also includes the linear extender 502, which is connected to the top of the body of the 3D printer. The 3D printer 550 can be accessed by opening curtains 552. With the curtains 552 opened, an operator can service the printer 550, for example to add or remove powder or to remove a printed object.

Figure 6A:
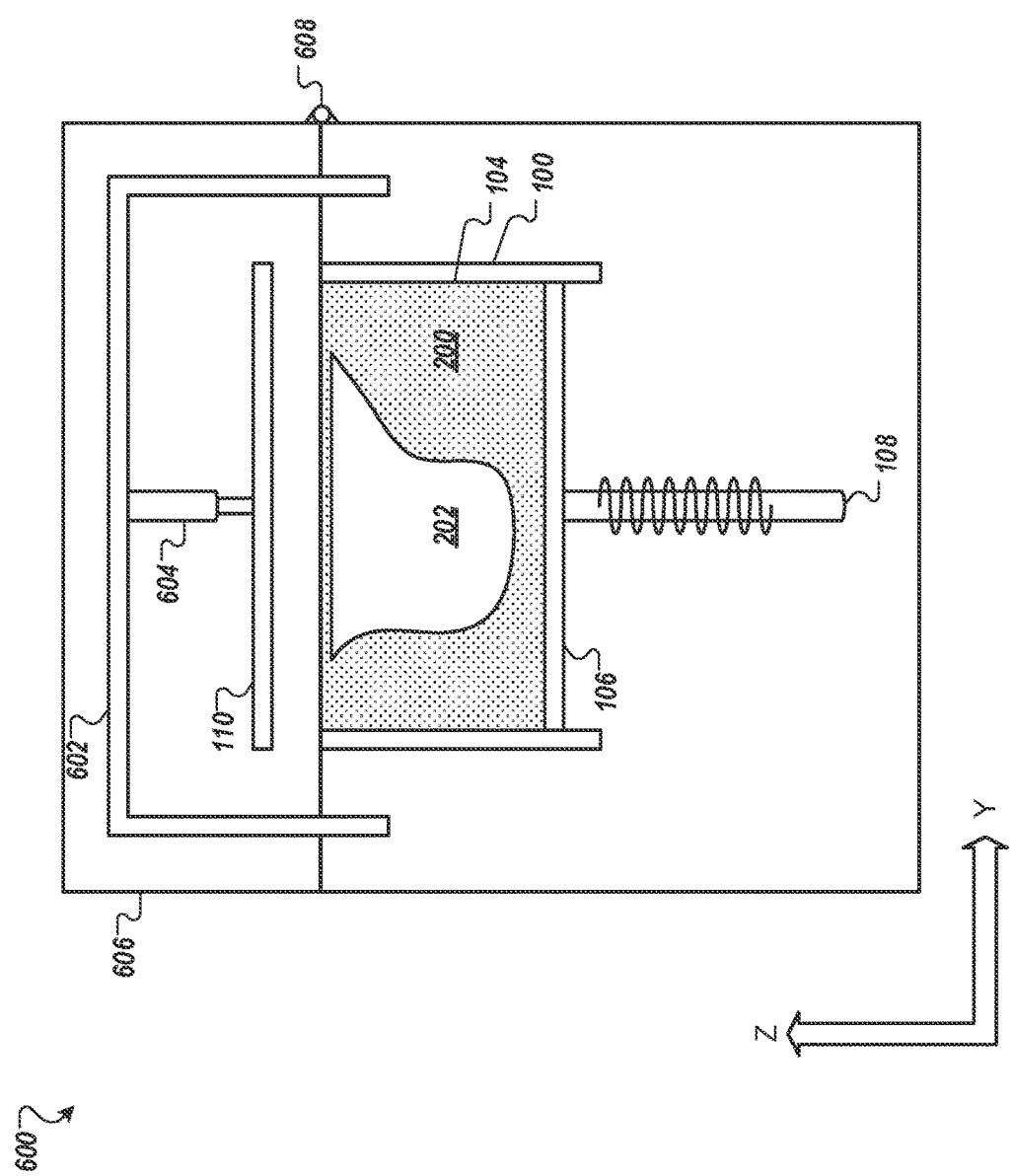

In FIG. 6A, a 3D printer 600 includes a bracket 602 and a linear extender 604. The bracket 602 and linear extender 604 are rigid members that can connect the elevation controller 108 with the compression plate 110. The linear extender 604 is capable of extending and retracting to move the compression plate 110 onto and away from the print bed 110. As shown, the linear extended 404 is refracted, with the compression plate 110 lifted away from the print bed 100.

When the powder 200 is compressed, either by, for example, the bottom plate 106 moving upward by the action of the elevation controller 108 and/or the compression plate 110 moving downward by the action of the linear extender 604, the forces can be transmitted along the linear extender 604, the bracket 602, and the body of the 3D printer 600.

The printer 600 can be accessed by lifting a lid 606, which can rotate around a hinge 608. With the lid 606 lifted, an operator can service the printer 600, for example to add or remove powder or to remove a printed object.

Figure 6B:
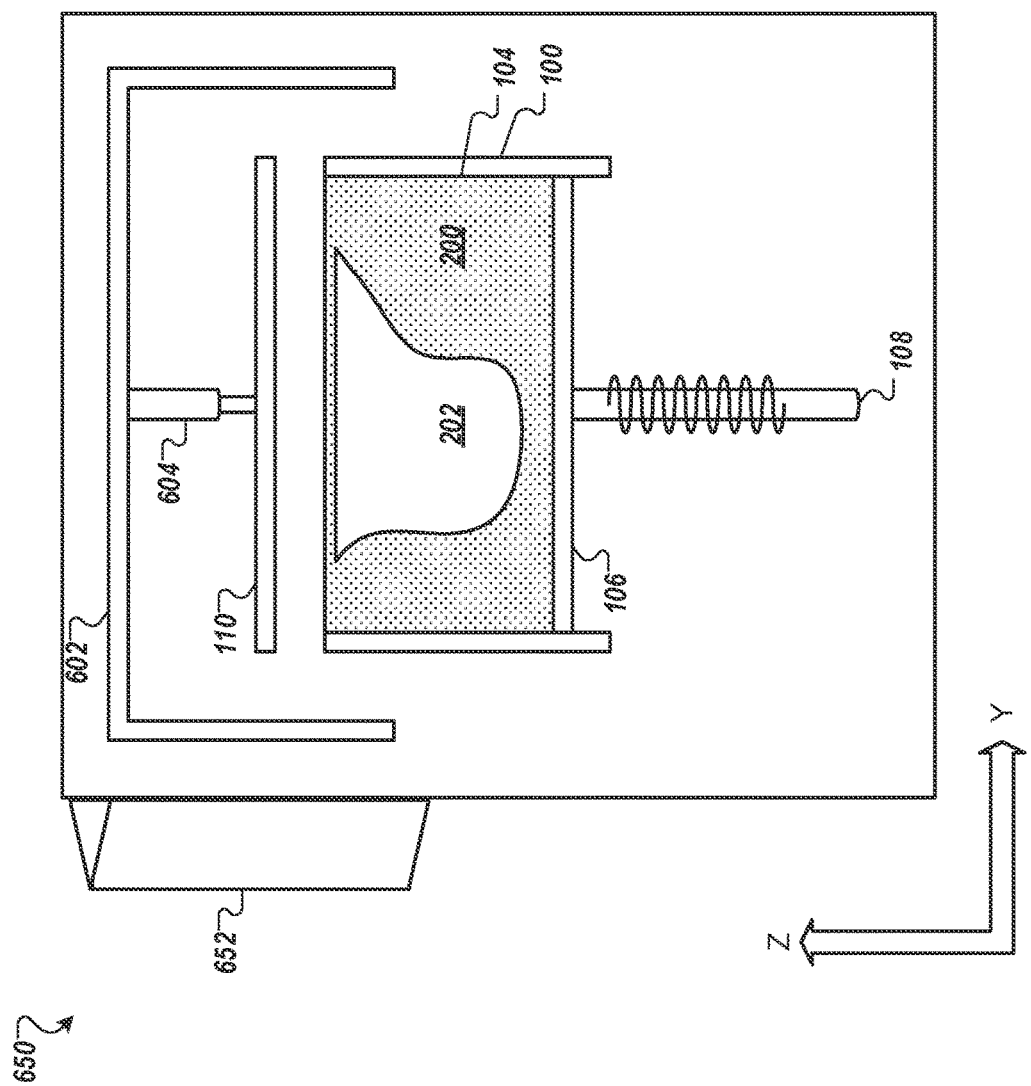

In FIG. 6B, 3D printer 650 also includes the bracket 602 and the linear extender 604. The printer 650 can be accessed by opening curtains 652. With the curtains 652 opened, an operator can service the printer 650, for example to add or remove powder or to remove a printed object.

While two mechanisms for accessing and services the printers are described here, it will be understood that other technologically appropriate mechanisms may be used. For example, a door with a handle on one side and hinges on the other may swing out toward the operator. A sliding panel or pane may slide open to allow access to a printer. These access mechanisms may be controlled by a human operator, by an automated operator (e.g., a robotic manipulator or processor controlled solenoid), or both. Additionally, the access mechanisms may be transparent, for example to allow an operator to observe the 3D printer in operation, or may be opaque.

Figure 7A:
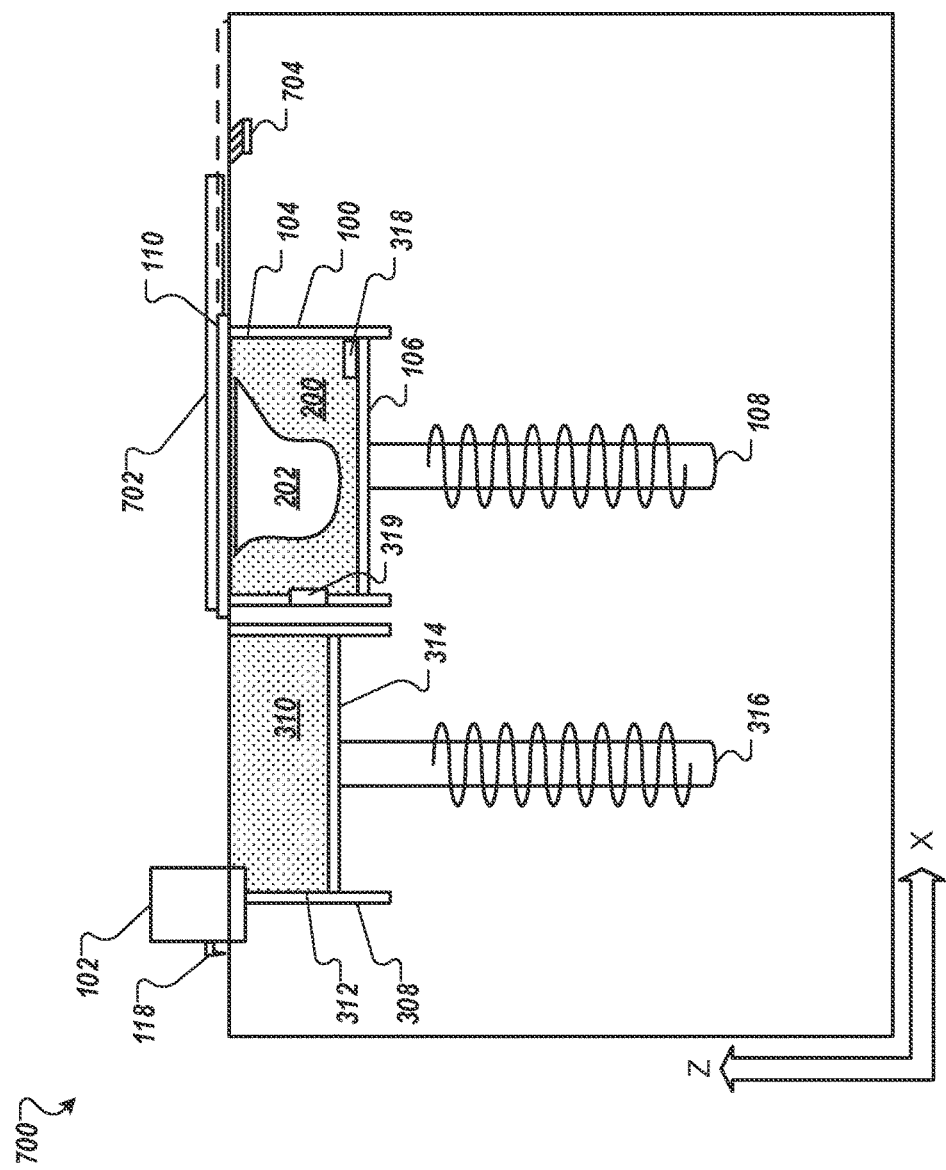
Figure 7B:
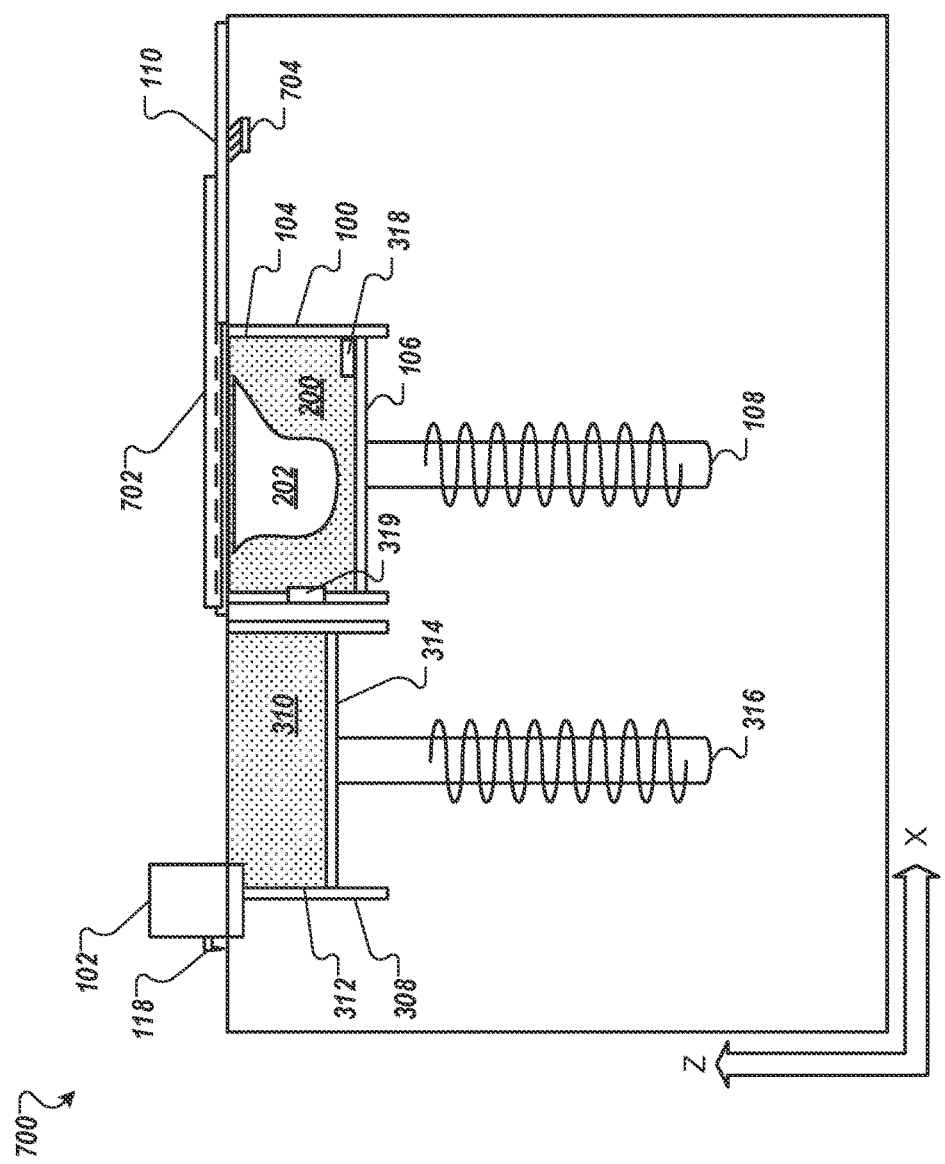

In FIGS. 7A and 7B, a 3D printer 700 includes a track 702 along which the compression plate 110 can slide. For example, a linear actuator, drive motor, or other drive mechanism in the track 702 can engage to slide the compression plate 110 along the track 702. FIG. 7A shows the compression plate 110 in the closed position, covering the basin 104. FIG. 7B shows the compression plate 110 in the open position, uncovering the basin 104.

In the 3D printer 700, the compression plate 110 may be made of a generally rectangular piece of a single material (e.g., a single plate of metal, polymer, or other suitable material). Additionally or alternatively, compression plate 110 may have features or elements to interface with the track 702 such as rollers or teeth to interface with a drive gear, etc. In some cases, a material may be selected based on the material's interaction with powder. For example, for areas of the compression plate that will come into contact with the powder, a material that is non-adherent to wet and dry powder, and that is non-absorbent of binder liquid, may be selected.

The drive mechanism of the track 702 may be controlled by a controller of the 3D printer 700 independently of, or in connection with, the trolley 102. For example, a drive gear may be communicably coupled to a controller and engaged to rotate in either direction. The control may be generally independent of the movement of the trolley 102, although anti-collision safeguards may be in place. In some other configurations, the compression plate 110 may be rigidly connected to the trolley 102 so that, as the trolley 102 moves in the X-direction, the compression plate 110 moves similarly.

As shown in FIGS. 7A and 7B, the compression plate 110 in the 3D printer 700 has a single degree of freedom. In some configurations, this single degree of freedom is only in the X direction. In such configurations, there is no degree of freedom in the Z direction in the 3D printer 700. This is in contrast to, for example, the 3D printer 600, in which the compression plate 110 has a single degree of freedom in the Z direction, and no degree of freedom in the X direction. In some configurations (not shown) a compression plate 110 can have a single degree of freedom that not aligned with any cardinal direction of the 3D printer 700. For example, a track may move the compression plate in a diagonal direction relative to the X and Z directions, possibly along a curved path (e.g., along an arc, along a straight path that curves near the end to seat the compression plate 110).

In other configurations, the compression plate 110 may have freedom in more than one direction, thus having multiple degrees of freedom. This may include redundant degrees of freedom that can create null spaces (e.g., areas where a manipulator controlling the compression plate 110 can move without moving the compression plate 110).

In some configurations, having no degree of freedom in parallel with the compressive forces (e.g., forces 206 and 208) may allow for comparatively greater control of the compression plate 110 in the Z direction. That is, the movement of the compression plate in the Z direction is due only to slop in the system, not movement of a control system. Alternatively, having no degree of freedom perpendicular (e.g., X and Y directions) to the compression forces (e.g., forces 206 and 208) may allow for comparatively reduced shear forces applied to the piece 202.

A powder remover 704 may be placed so that, when the compression plate 110 moves past the powder remover 704, the powder remover 704 can remove powder that is attached to the underside of the compression plate 110. In some configurations, the compression of the powder 200 may cause some powder 200 to adhere to the underside of the compression plate 110. This powder remover 704 can remove the powder so that the compression plate 110 is clean when it returns to the closed position. The powder remover 704 can include a bristle brush, a rubber wiper, or other appropriate features that can remove powder from the compression plate 110 without damaging the compression plate 110. Additionally or alternatively, vibratory energy may be applied to the compression plate 110 to remove this powder. This vibratory energy may be applied by the powder remover 704 and/or by a different mechanism.

Figure 8A:
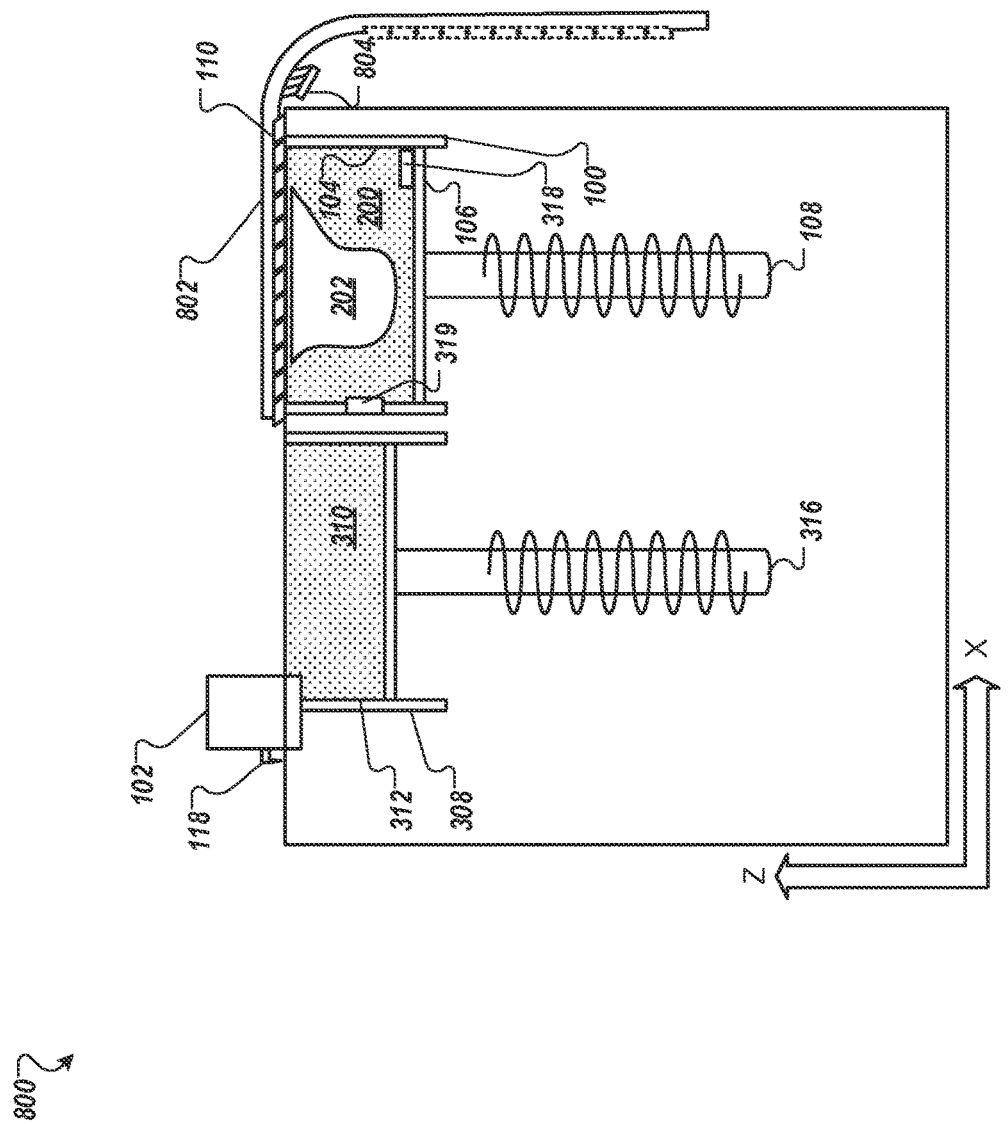
Figure 8B:
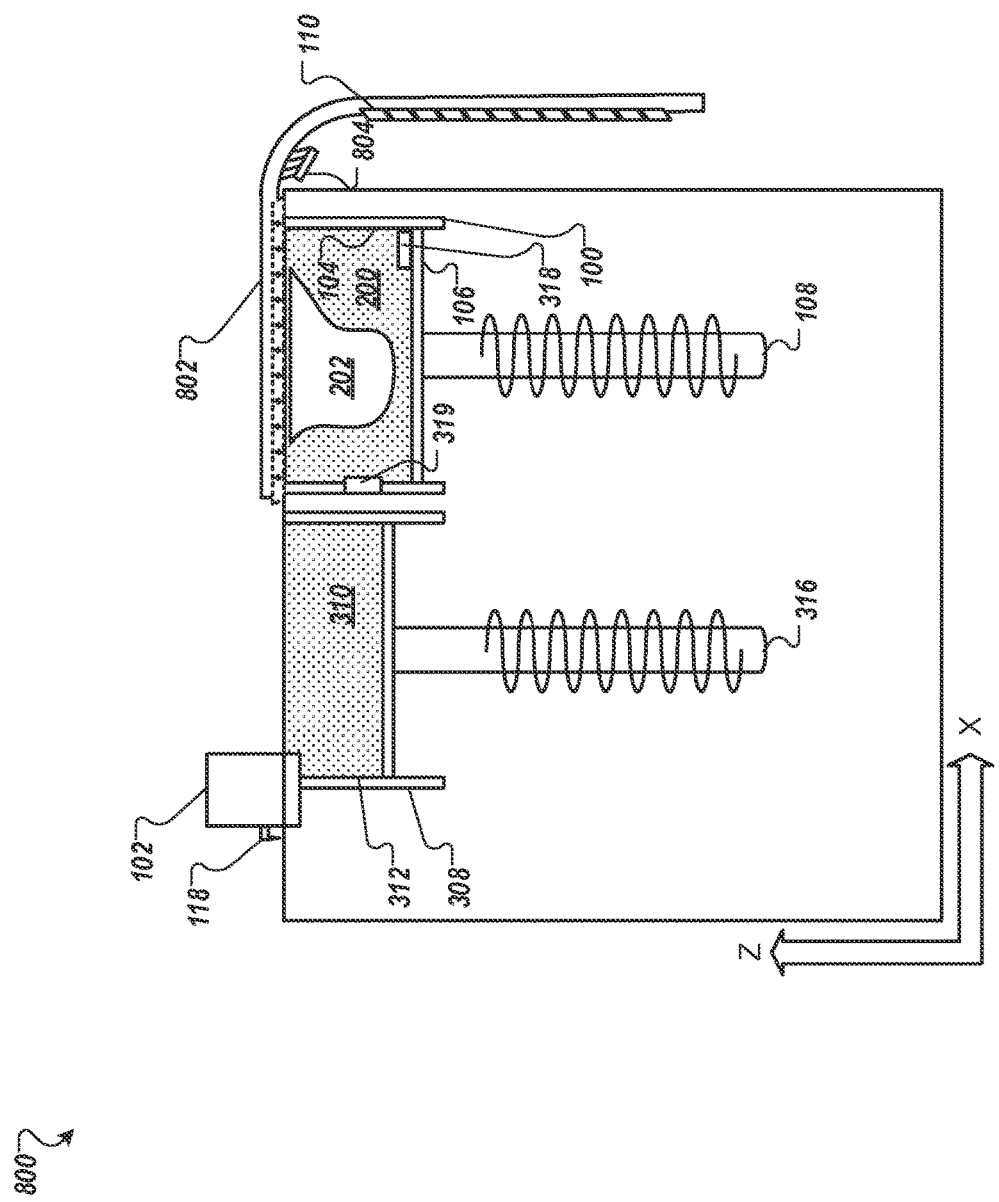

In FIGS. 8A and 8B, a 3D printer 800 includes a track 802 along which the compression plate 110 can slide. For example, a linear actuator, drive motor, or other drive mechanism in the track 802 can engage to slide the compression plate 110 along the track 802. FIG. 8A shows the compression plate 110 in the closed position, covering the basin 104. FIG. 8B shows the compression plate 110 in the open position, uncovering the basin 104.

In the 3D printer 800, the compression plate 110 may include a generally rectangular, flexible plate that may be backed by reinforcing bars or slats. The flexible plate may be made of a material such as a polymer that is flexible enough to traverse the curve shown in the track 802. In some cases, a material may be selected for the flexible plate based on the material's interaction with powder. For example, in addition to being selected based on flexibility, a material that is non-adherent to wet and dry powder, and that is non-absorbent of binder liquid, may be selected. The reinforcing bars or slats may be made of a more rigid material such as a more rigid polymer or metal. In some configurations, the flexible plate may be thick and/or resilient enough that, when the powder 200 is compressed, the reinforcing bars or slats do not imprint on the surface of the powder 200. In other examples, the compression plate 110 may be made of different shapes and/or materials, and may have other features.

The drive mechanism of the track 802 may be controlled by a controller of the 3D printer 800 independently of, or in connection with, the trolley 102. For example, a drive gear may be communicably coupled to a controller and engaged to rotate in either direction. The control may be generally independent of the movement of the trolley 102, although anti-collision safeguards may be in place. In some other configurations, the compression plate 110 may be rigidly connected to the trolley 102 so that, as the trolley 102 moves in the X-direction, the compression plate 110 is moves similarly.

As shown in FIGS. 7A and 7B, the compression plate 110 in the 3D printer 700 has a single degree of freedom in the X direction. There is no degree of freedom in the Z direction in the 3D printer 700. This is in contrast to, for example, the 3D printer 600, in which the compression plate 110 has a single degree of freedom in the Z direction, and no degree of freedom in the X direction. In some configurations, having no degree of freedom in parallel with the compressive forces (e.g., forces 206 and 208) may allow for comparatively greater control of the compression plate 110 in the Z direction. That is, the movement of the compression plate in the Z direction is due only to slop in the system, not movement of a control system. Alternatively, having no degree of freedom perpendicular (e.g., X and Y directions) to the compression forces (e.g., forces 206 and 208) may allow for comparatively reduced shear forces applied to the piece 202.

A powder remover 704 may be placed so that, when the compression plate 110 moves past the powder remover 704, the powder remover 704 can remove powder that is attached to the underside of the compression plate 110. In some configurations, the compression of the powder 200 may cause some powder 200 to adhere to the underside of the compression plate 110. This powder remover 704 can remove the powder so that the compression plate 110 is clean when it returns to the closed position. The powder remover 704 can include a bristle brush, a rubber wiper, or other appropriate features that can remove powder from the compression plate 110 without damaging the compression plate 110. Additionally or alternatively, vibratory energy may be applied to the compression plate 110 to remove this powder. This vibratory energy may be applied by the powder remover 704 and/or by a different mechanism.

Compression Plate Seating

FIG. 9A-9B are examples of schematic views of granular print materials in print beds. Both views show a 3D printer along the Y-axis. In both views, the print bed 100, basin 104, bottom plate 106, compression plate 110, powder 200, and where appropriate, the top layer 204 are visible.

On the left side of both views, the powder 200 and top layer 204 are shown before compression. On the right side of both views, the powder 200 is shown after compression. In both cases, the compression of the top layer 204 increases the density of the top layer 204, for example, to match the density of the rest of the powder 200.

In FIG. 9A, the compression plate 110 is wider than the opening of the basin 104. As such, it contacts the top of the walls of print bed 100 to completely encase the powder 200. In FIG. 9B, the compression plate 110 fits within the walls that form the basin 104. As such, it contacts the print bed 100 inside the basin 104 to completely encase the powder 200. In addition, this configuration may avoid the need for sweepers to clear the top edges of the walls of the print bed 100 of any spilled power.

As shown here, the powder 200 can be compressed. In other configurations of a 3D printer, the powder 200 may also be tamped and/or vibrated.

Unlike compression, in which a force is applied slowly, tamping involves applying a force quickly, resulting in a higher impulse. The compression plate 110, if moved quickly, can alternatively apply a tamping force instead of a compression force to the powder 200.

Different from both compression and tamping is vibration. Vibration is oscillation of the powder 200, often quickly. The vibration may be imparted to the powder 200 by, for example, a cam or off-set weight rotating around a central axis, but other forms of vibration generation are possible.

One or more, e.g., each, of compression, tamping, and vibration can be used for any number of purposes. If configured properly, each, all, or any combination of the three may be used to increase the density of the powder 200. However, the presence of one does not imply or necessitate the presence or absence of either of the other two.

3D Printing Materials

The processes and systems described herein can be used with a wide variety of materials and build processes. For example, the granular, e.g., powder, material used can be any powder suitable for binding with a liquid binder. Examples of some such powders and binders are described in U.S. Pat.

No. 8,475,946 entitled "Ceramic Article and Method of Manufacture," the contents of which are hereby incorporated by reference.

Alternative powders that may be used include, but are not limited to the following: Stoneware: Stoneware clays, which may include ball clay or fire clay 80%; Feldspar 20%; and optionally in percentages from 0.25% to 5% sodium silicate, carboxymethyl cellulose, and/or calcium aluminate.

Porcelain: Kaolin 70%; feldspar 30%; and optionally in percentages from 0.25% to 5% sodium silicate, carboxymethyl cellulose, and/or calcium aluminate.

Earthenware: Redart or other high iron clay 50%; stoneware clay which may include ball clay or fire clay 40%; frit or other fluxes 10%; and optionally in percentages from 0.25% to 5% sodium silicate, carboxymethyl cellulose, and/or calcium aluminate.

Alternative binders that may be used include distilled water, optionally including one or more additives such as:

Organic glues including but not limited to polyvinyl alcohol, polyvinyl acrylate, and carboxymethyl cellulose.

Surfactants, which can act as emulsifiers and or wetting agents including, but not limited to glycerol.

Thinning agents, including but not limited to various forms of alcohol.

Ceramic precursors, such as, but not limited to sodium silicate.

The powders may have a range of grain sizes. For some applications, such as some for printed objects that measure on the inch or centimeter scale, a powder size in the range of about 40 mesh to about 400 mesh may be used. In some other applications, such as for some printed objects that measure on the foot or meter scale, a larger powder size and correspondingly larger layer size may be used. In yet still some other applications, such as some micro-printing of objects that are either very small or have features that are very small, a powder size smaller than 400 mesh may be used, including powder sizes on the order of sub-microns. Additionally, a powder may have a mix of different sized grains. For example, a powder with multiple ingredients may have a different grain size for every ingredient. In another example, a single ingredient in a powder may have grains of different sizes.

In some cases, a mix of grain size or all small grain sizes can allow for tighter packing, that is, higher density under compression, than larger grain sizes. This may be, for example, because larger grain sizes may produce larger voids when packed. Additionally, the geometry of grains can also impact packing density. For example, given grains of the same size, cubic grains can pack more tightly than spherical grains when under compression, because the flat surfaces of cubes may rest against each other, while spheres may only touch on tangents.

While the binder is usually discussed as a liquid, the binder may not be liquid at room temperature or under otherwise stable conditions. Some binders may be solid, including in powder form, at room temperature. These binders may be heated before being printed. Alternatively, some powder binders may become fluid under vibration, and they may be vibrated as part of the printing process. The binder may be generally clear, may naturally have an opaque or semi-opaque color, or may have a dye added. The dye may be used, for example, to improve visibility when printing and/or for ornamental purposes for the finished piece. The binder used may be a single solution or mixture, or may be a multipart mixture delivered in two or more steps. For example, a single mixture binder may be dispensed by a single device (e.g. a single print head, a single pipette). In other examples, a multipart mixture may have a first component delivered by a first device, and then a second component may be delivered by a second device. In one example, a multipart print head, such as that used to print different colored ink, may be modified to print two or more components of a binder.

In some cases, other components may be mixed into a powder and/or binder to affect the properties of the pieces printed. In one example, glass beads or powder may be mixed into an otherwise ceramic powder. In another example, a metallic powder may be mixed into an otherwise ceramic powder. These additives may affect the final piece's mechanical properties (e.g., mass, compressive strength), thermal properties (e.g., heat transfer, thermal mass), magnetic properties (e.g., ferromagnetic or paramagnetic), or other properties (e.g., color). For example, a metallic metal powder such as iron may be mixed into a ceramic powder in order to create a piece that appears to be a ceramic and that is ferromagnetic.

Many build materials, such as ceramic powder, can be fired or otherwise cured after printing. For example, an object printed of ceramic powder may be relatively fragile when removed from the 3D printer. To solidify the piece, it can be fired in a kiln. In some cases, the printed objects described in this document can be fired in substantially the same way non-printed (e.g., hand-thrown) ceramics are. For example, printed ceramics may be fired at a temperature range of about 1700-2400 degrees Fahrenheit, which is similar to traditional earthenware at the lower end of this range and porcelain at the higher ranges. As such, printed ceramics may be fired in the same kilns that are used for, or designed for, non-printed ceramics. On the other hand, printed ceramics may be created for uses for which these traditional ceramics are not appropriate. For these and other applications, the printed ceramics may be fired at much higher temperatures, including temperatures above 3000 degrees Fahrenheit. Additionally, time and atmospheric parameters used to fire printed ceramics may be the same or different as those used in traditional ceramics. In general, the firing parameters may be based on the materials used in the object and the desired properties after firing, similar to the considerations for firing traditional ceramics. Other forms of curing may be used as appropriate. For example, a piece made with photo-reactive resin may be cured in an ultraviolet chamber.

In general, ceramic powders and liquid binders have been described, but any other technologically appropriate types of 3D printing materials may be used. For example, sand and a water binder may be used to create casts for sand-casting. In another example, a metal powder may be used, and instead of a liquid binder, a laser or other heat source is used to fuse the metal powder into a 3D object.

Variable Density Printing

Figure 10:
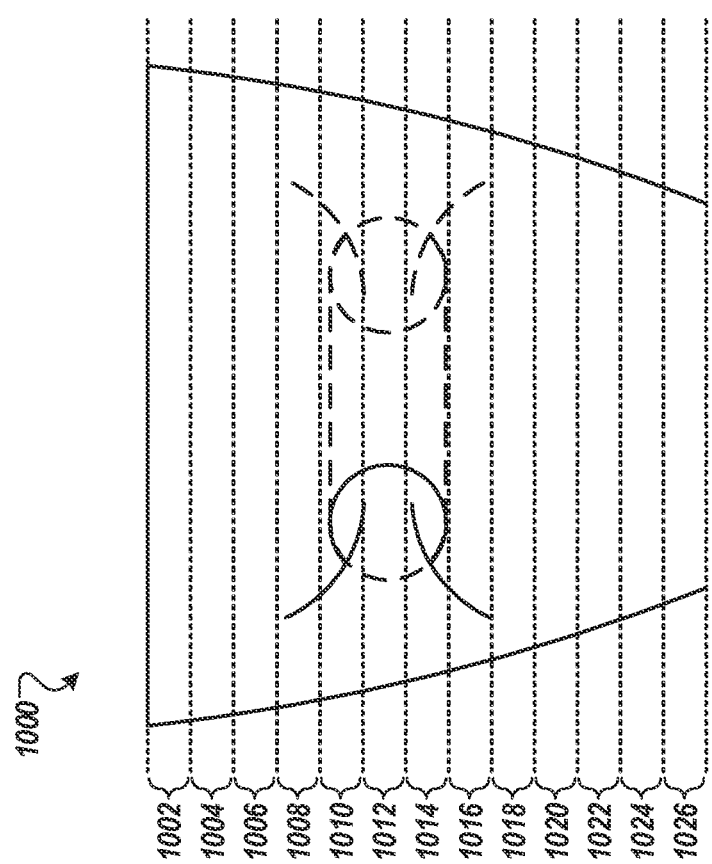
FIG. 10 is a schematic diagram that shows an example of a 3D object with variable density in different layers of the object.

FIG. 10 is a schematic diagram that shows an example of a 3D object 1000 that has been printed with variable density in different layers. The object 1000 is a fluid heat exchanger. It is a thin-walled piece that is generally shaped as a hollow funnel with an internal passage perpendicular to the funnel. In use, a cold fluid flows through the funnel, downward in the shown orientation, and a hot fluid flows horizontally through the internal passage. If the material of the object 1000 is heat permeable, but not fluid permeable, the hot fluid cools by offloading thermal energy onto the cold fluid without mixing. If the material of the object 1000 is heat permeable and fluid permeable, hot fluid cools by offloading thermal energy onto the cold fluid and the hot and cold fluids can mix by passing through the wall of the passage.

The object 1000 has been constructed by a 3D printer that is able to control the density of the build material, such as has been described herein. The object 1000 is made of a ceramic powder and liquid binder printed in layers 1002-1026 and subsequently fired in a kiln. As such, each layer 1002-1026 has a density that was predetermined in the build plan used by the 3D printer that printed the object 1000.

In one example, each layer 1002-1026 has the same, or nearly the same, density. In this example, for each layer, the 3D printer has caused the compression of each layer to be the same, whether measured in terms of time, distance traveled by a plate, or measured density of the build powder. For powders that do not transmit compressive forces beyond the top, uncompressed, layer, each layer 1002-1026 will have nearly the same density. In some cases, this may be possible because the unbound powder surrounding the object may have sufficient dry density to hold the object in position. For powders that do transmit compressive forces beyond the top, uncompressed, layer, each layer 1002-1026 will have a slightly different density, with the lower layers having higher densities as they have been subjected to more overall compressive force.

In another example, each layer 1002-1026 may have the same final density even though the object 1000 is made from a powder that does transmit compressive forces beyond the top, uncompressed, layer. In such a case, each layer 1002-1026 may be initially compressed to different densities, with the bottom layer 1026 having the lowest initial density and the top layer 1002 having the highest initial density, and each other layer having an initial density that is interpolated based on its vertical location within the final object 1000. In this configuration, the layers with the lowest initial densities are compressed the most often, resulting in a final product in which each layer has been compressed by the same total amount and therefor have the same final density.

An object 1000 with the same, or nearly the same, density throughout may be useful in a number of applications. For example, if the fluids are under substantial pressure, a sufficiently high density object 1000 may be needed to allow the object 1000 to handle those pressures, along with an appropriate factor of safety.

In yet another example, some layers or every layer 1002-1026 has a different final density. For example, the top and bottom sections of the object 1000 may interface with other machines and require greater structural strength to prevent cracking, while the internal passage of the object 1000 must have a lower density to be heat and/or fluid permeable.

To reach these design constraints, different layers are configured to have different final densities. Layers 1002, 1004, 1024, and 1026, which are the areas of the object 1000 to interface with another machine, are printed with a first, highest density. Layers 1010-814, which are the areas of the object 1000 that must be heat and/or fluid permeable, are printed with a second, lowest density. The remaining layers 1006, 1008, and 1016-822, can be printed with a third, intermediate density.

For cases in which the density of a layer increases the more times the overall object is subjected to compression, the layers can continue to reduce in vertical size as their density increases, since the amount of material per layer stays constant—or nearly so. This reduction in size may be accounted for in the logic used to print the object.

In some cases, where the 3D printer is capable of creating layers of different thickness, the initial layer may be created with the greatest thickness, and successive layers printed with successively decreased thicknesses. As an object is printed in this manner, the bottom layer will be repeatedly compressed, reducing its vertical size. If the step-down in size per layer is calibrated correctly, each layer will begin with a different initial thickness and end up with the same final thickness when the object is completely printed Alternatively, the layering-designing process may be used to create an object with thinner layers at the bottom and progressively larger layers at the top, or vice versa. Many build plans are created by inputting a solid model of a desired object, and splitting the solid model into virtual slices, with each virtual slice corresponding to a layer of the final, printed object. Instead of slicing the model into equal thickness slices, the build plan can be created, for example, with slices that are smallest at the bottom of the model and progressively larger higher up the model. If the step-up in size per layer is calibrated correctly, each layer will begin with the same initial thickness and end up with the same final thickness.

Figure 11:
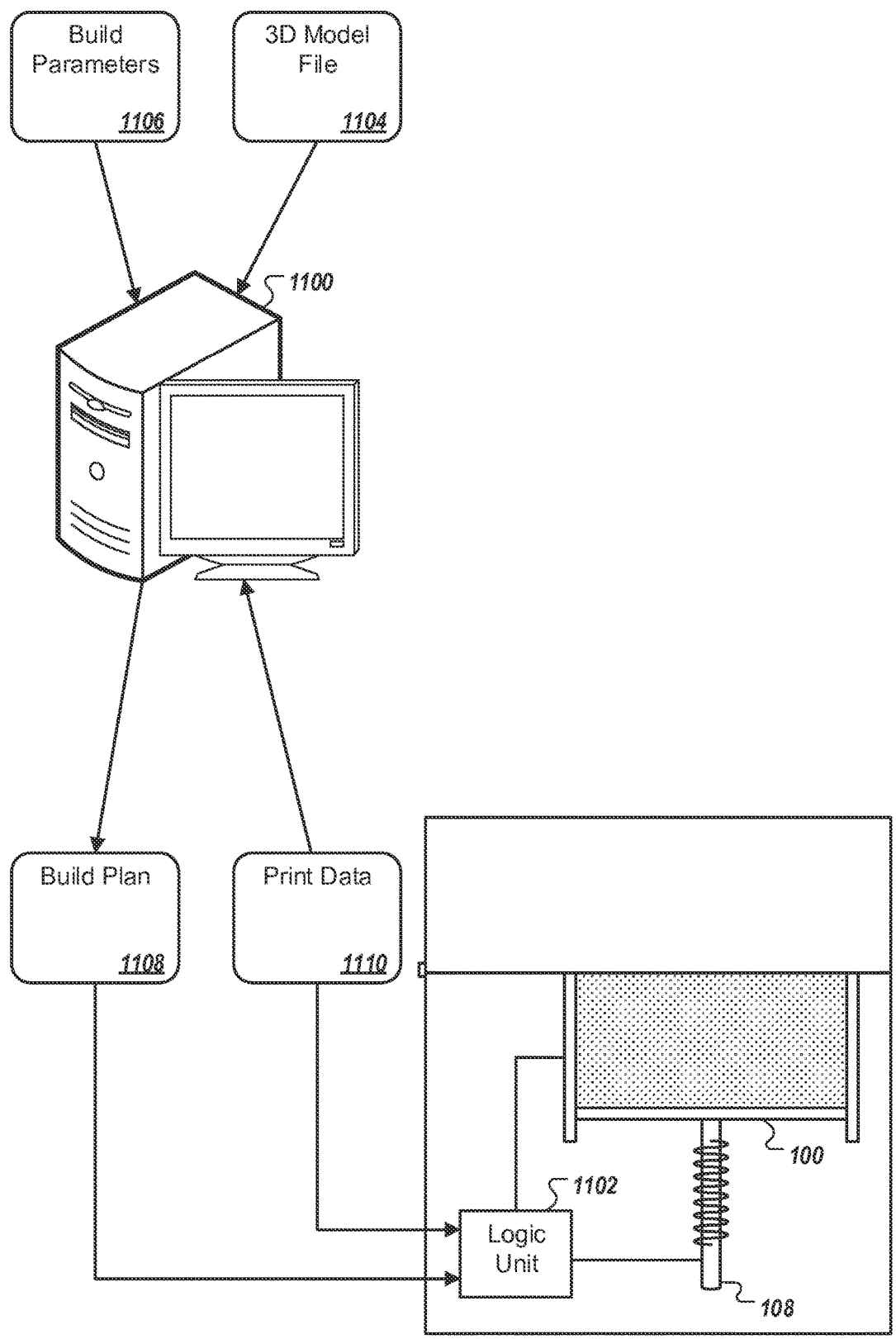
FIG. 11 is a schematic diagram that shows data used by a 3D printer with controllable compression in the Z-axis.

FIG. 11 is a schematic diagram that shows data used by a 3D printer with controllable compression in the Z-axis. Shown here, a computer 1100 is communicably coupled to a logic unit 1102 of a 3D printer. In this example, the computer 1100 uses a 3D model file 1104 and build parameters 1106 to create a build plan 1108. While the 3D printer executes the build plan 1108, the logic unit 1102 can report print data 1110 back to the computer 1100. Examples of the computer 1100 and the logic unit 1102 are described below with reference to FIG. 10.

The computer 1100 contains software that communicates with the logic unit 1102. This software allows a user or other system to provide the 3D model file 1104 and build parameters 1106 that can be used by the computer 1100 to create the build plan 1108. The 3D model file 1104 may be in the format of, for example, DAE, OBJ, STL, X3D, WRL, or any other appropriate common or custom file format. Example parameters include, but are not limited to the following:

Start Layer—The layer at which a piece beings to be built in a build bed.

Binder Saturation—A value on a linear scale representing, for instance, light to heavy saturation. This parameter may be influenced by the physical properties of a print head or other hardware.

Powder Layer Thickness—a value on a linear scale representing, for instance, thick to thin based on physical properties of a spreader bar or other hardware.

Scale—a desired scale to be printed.

Compression—a percentage, absolute measure, or other indication of compression to be applied to each layer.

Compensation—one or more compensation values to compensate for compression.

The logic unit 1102, which may be enclosed by, mounted on, or physically outside of the 3D printer, can receive the build plan 1108 and initiate the printing of the a piece in the print bed 100. The logic unit can actively compensate for distortions in the Z-axis of the printing, for example by enlarging a layer of the build plan so that it reaches a desired thickness when compressed. Deviations from expected thicknesses can be measured by the logic unit 1102 and further compensated. For example, if the logic unit 1102 observes each layer compressing 3% more than expected, the logic unit 1102 may enlarge some or all of the layers of the print job accordingly. Alternatively, the logic unit 1102 may report the status of the printing to the computer 1100, and the computer 1100 may make these compensations.

As an example, at layer number one hundred of a particular build plan 1108, the elevation controller 108 should be holding the build bed 100 1 cm from the first printed layer to maintain vertical accuracy of the part. This can be calculated by the software of the computer 1100 or the logic unit 1102 based on the Scale parameters of the build parameters 1106. If the position of the elevation controller 108 is the equivalent of one layer thickness less than the correct distance due to compression, an additional layer can be printed. This correction may happen up to every other layer or may happen every tenth layer or may vary as the print process proceeds. If, for example, the Compression is set at a high percentage, the correction may happen more often than if the Compression is set to a low percentage.

Communications between the computer 1100 and the logic unit 1102 may occur in both directions and continuously during a build process. Once the computer 1100 sends the build plans 1108 to the logic unit 1102, the logic unit 1102 can constantly monitor the status of the build process and report to the computer 1100. This report may include, for example, layer number, deviation from expected z-value, etc. When the deviation is great enough to require an additional layer be printed, this event may be reported by the logic unit 1102 to the computer 1100. The computer 1100 may display the occurrence of this event to a user (e.g., shown on a monitor, audibly via a speaker or alarm). Additionally, this and other events may be logged to a log file and, for example, stored to memory and/or printed via a paper printer.

Computer Systems

Figure 12:
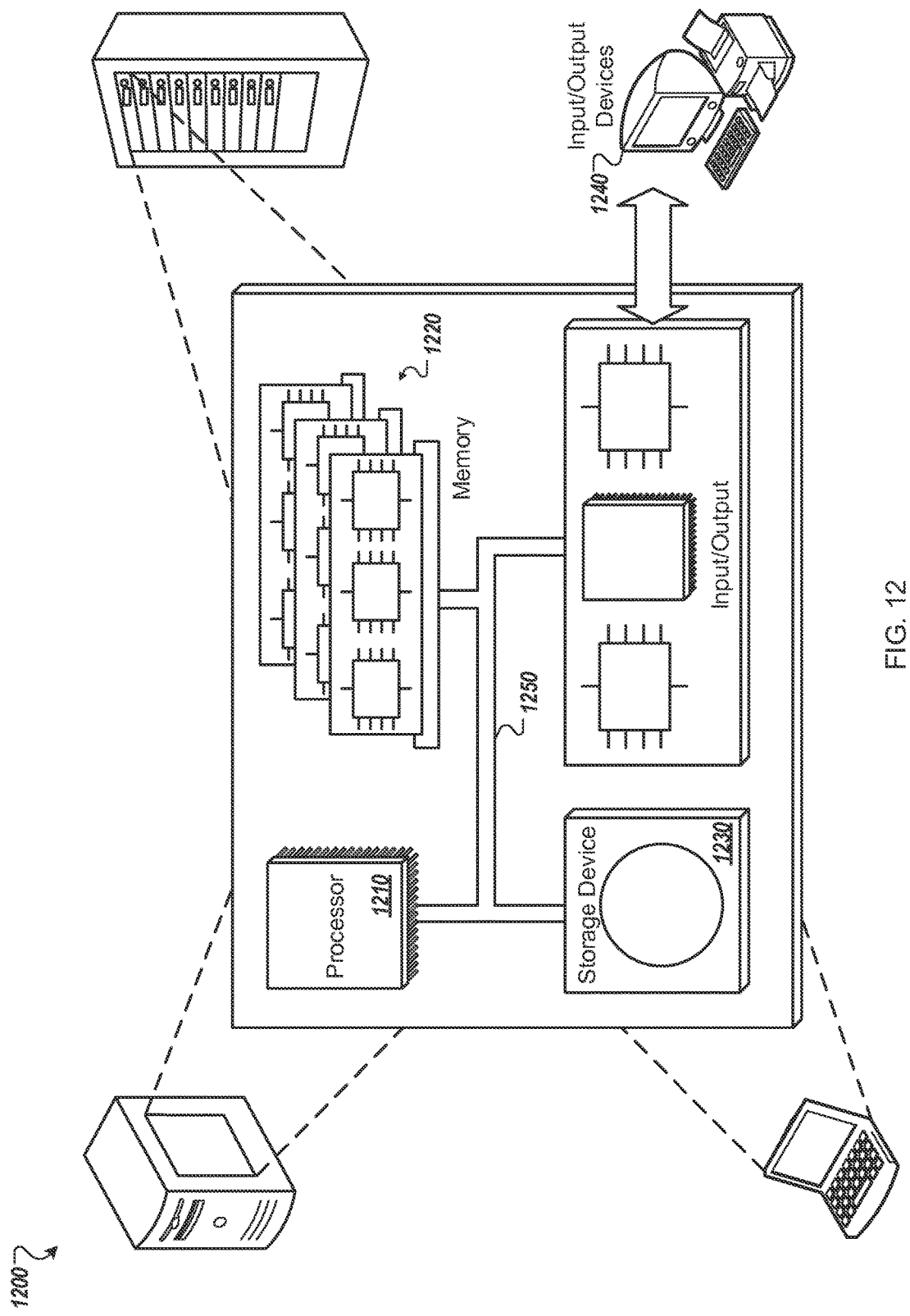
FIG. 12 is a schematic diagram that shows an example of a computing system.

FIG. 12 is a schematic diagram that shows an example of a computing system 1200 that can be used for some or all of the operations described previously, according to various implementations. The computing system 1200 includes a processor 1210, a memory 1220, a storage device 1230, and an input/output device 1240. Each of the processor 1210, the memory 1220, the storage device 1230, and the input/output device 1240 are interconnected using a system bus 1250. The processor 1210 is capable of processing instructions for execution within the computing system 1200. In some implementations, the processor 1210 is a single-threaded processor. In some implementations, the processor 1210 is a multi-threaded processor. The processor 1210 is capable of processing instructions stored in the memory 1220 or on the storage device 1230 to display graphical information for a user interface on the input/output device 1240.

The memory 1220 stores information within the computing system 1200. In some implementations, the memory 1220 is a computer-readable medium. In some implementations, the memory 1220 is a volatile memory unit. In some implementations, the memory 1220 is a non-volatile memory unit.

The storage device 1230 is capable of providing mass storage for the computing system 1200. In some implementations, the storage device 1230 is a computer-readable medium that may be tangible. In various different implementations, the storage device 1230 may be a floppy disk device, a hard disk device, an optical disk device, or a tape device.

The input/output device 1240 provides input/output operations for the computing system 1200. In some implementations, the input/output device 1240 includes a keyboard and/or pointing device. In some implementations, the input/output device 1240 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device, such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A three-dimensional (3D) printing system comprising:
a 3D printer comprising:
   a print bed comprising one or more walls arranged to enclose a basin configured to contain a powder printing material;
   a compression plate configured to fit slidably between the one or more walls within the basin, or to rest on top surfaces of the one or more walls of the print bed, the compression plate configured to be selectably raised or lowered relative to the one or more walls; and
   a bottom plate that forms a base of the basin and is configured to fit slidably between the one or more walls of the print bed; and
an elevation controller to move one or both of the compression plate and the bottom plate towards each other to apply a specified compressive force on the powder printing material within the basin, the elevation controller, the compression plate, and the bottom plate together configured such that at most only vertical force components are generated by each of the compression plate and the bottom plate when applying the specified compressive force on the powder printing material, wherein the print bed and the compression plate are together configured to prevent horizontal shear within the powder printing material with the basin, and wherein the compression plate and the bottom plate together with the one or more walls seal the basin sufficiently to avoid leakage of the powder printing material from the basin.

2. The system of claim 1, further comprising a processor programmed to control the 3D printer to print an object by:
   i) loading the powder printing material into the basin of the print bed;
   ii) applying a compressive force to the powder printing material; and
   iii) printing a binder onto the compressed powder printing material.

3. The system of claim 1, wherein, the compression plate is rotationally coupled to the 3D printer by a hinge.

4. The system of claim 3, wherein to apply a compressive force to the powder printing material, the 3D printer is controlled to rotate the compression plate to contact the top surfaces of the one or more walls of the print bed.

5. The system of claim 1, wherein the elevation controller comprises a linear actuator configured to move the compression plate toward the bottom plate.

6. The system of claim 1, wherein the elevation controller engages the bottom plate and is configured to move the bottom plate toward the compression plate.

7. A three-dimensional (3D) printing system, comprising:
a three-dimensional (3D) printer comprising:
   a print bed comprising one or more walls arranged to enclose a basin configured to contain a powder printing material;
   a compression plate configured to fit slidably between the one or more walls within the basin, or to rest on top surfaces of the one or more walls of the print bed, the compression plate configured to be selectably raised or lowered relative to the one or more walls; and
   a bottom plate that forms a base of the basin and is configured to fit slidably between the one or more walls of the print bed; and
means for moving one or both of the compression plate and the bottom plate towards each other to apply a specified compressive force on the powder printing material within the basin, the elevation controller, the compression plate, and the bottom plate together configured such that at most only vertical force components are generated by each of the compression plate and the bottom plate when applying the specified compressive force on the powder printing material, wherein the print bed and the compression plate are together configured to prevent horizontal shear within the powder printing material with the basin, and wherein the compression plate and the bottom plate together with the one or more walls seal the basin sufficiently to avoid leakage of the powder printing material from the basin.

8. The system of claim 7, further comprising a processor programmed to control the 3D printer to print an object by:
   i) loading the powder printing material into the basin of the print bed;
   ii) applying a compressive force to the powder printing material; and
   iii) printing a binder onto the compressed printing material.

9. The system of claim 7, wherein, the compression plate is rotationally coupled to the 3D printer by a hinge.

10. The system of claim 9, wherein to apply a compressive force to the powder printing material, the 3D printer is controlled to rotate the compression plate to contact the top surfaces of the one or more walls of the print bed.

11. The system of claim 7, the system further comprising a linear actuator configured to move the compression plate toward the bottom plate.

12. The system of claim 7, wherein the bottom plate is configured to move toward the compression plate.

13. A method of three-dimensional (3D) printing, the method comprising:
   loading a powder printing material into a basin of a print bed of a 3D printer, wherein the print bed comprises one or more walls that enclose the basin; and
   applying a compressive force to the powder printing material with an elevation controller configured to move one or both of a compression plate and a bottom plate towards each other to apply a specified compressive force on the powder printing material within the basin, the elevation controller, the compression plate, and the bottom plate together configured such that at most only vertical force components are generated by each of the compression plate and the bottom plate when applying the specified compressive force on the powder printing material, wherein the print bed and the compression plate are together configured to prevent horizontal shear within the powder printing material with the basin, and wherein the compression plate is configured to fit slidably between the one or more walls within the basin, or to rest on top surfaces of the one or more walls of the print bed, wherein the bottom plate forms a base of the basin and is configured to fit slidably between the one or more walls of the print bed, wherein the compression plate is configured to be selectably raised or lowered, and wherein the compression plate and the bottom plate together with the one or more walls seal the basin sufficiently to avoid leakage of the powder printing material from the basin.

14. The method of claim 13, wherein the compression plate is rotationally coupled to the 3D printer by a hinge.

15. The method of claim 14, wherein to apply a compressive force to the powder printing material, the 3D printer is controlled to rotate the compression plate to contact the top surface of the one or more walls of the print bed.

16. The method of claim 13, wherein the elevation controller comprises a linear extender configured to move the compression plate toward the bottom plate.

17. The method of claim 13, wherein the elevation controller engages the bottom plate and is configured to move the bottom plate toward the compression plate.

* * * * *